US010980064B2

(12) United States Patent
Narasimha et al.

(10) Patent No.: US 10,980,064 B2
(45) Date of Patent: Apr. 13, 2021

(54) RADIO COMMUNICATIONS USING RANDOM ACCESS IN WIRELESS NETWORKS

(71) Applicant: Futurewei Technologies, Inc., Plano, TX (US)

(72) Inventors: Murali Narasimha, Vernon Hills, IL (US); Weimin Xiao, Hoffman Estates, IL (US); Qian Cheng, Aurora, IL (US); Jialing Liu, Palatine, IL (US); Vipul Desai, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 16/008,783

(22) Filed: Jun. 14, 2018

(65) Prior Publication Data

US 2018/0368189 A1    Dec. 20, 2018

Related U.S. Application Data

(60) Provisional application No. 62/521,216, filed on Jun. 16, 2017.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04W 56/001* (2013.01); *H04W 72/046* (2013.01); *H04W 74/006* (2013.01)

(58) Field of Classification Search
CPC ........... H04W 74/0833; H04W 56/001; H04W 72/046; H04W 74/006; H04L 5/0053
See application file for complete search history.

(56) References Cited

U.S. PATENT DOCUMENTS 10,855,420 B2 * 12/2020 Park ................. H04L 5/0048
10,856,261 B2 * 12/2020 Ko ................... H04W 72/0466
(Continued)

FOREIGN PATENT DOCUMENTS

WO      2016086144 A1    6/2016

OTHER PUBLICATIONS

International Search Report and Written Opinion dated Sep. 14, 2018, in PCT Patent Application No. PCT/2018/037860.
(Continued)

*Primary Examiner* — Michael J Moore, Jr.
(74) *Attorney, Agent, or Firm* — Vierra Magen Marcus LLP

(57) ABSTRACT

An efficient random access procedure is provided for reduced control overhead of connections in random access systems. A base station transmits one or more synchronization signal (SS) blocks. A UE detects and determines a preferred SS block. The UE transmits multiple random access signals (e.g., PRACH signals) in a RACH occasion. Each PRACH signal is transmitted on a different beam and includes a RACH preamble. The base station receives one or more of the PRACH signals. The RACH occasion and optionally the RACH preamble identify the preferred SS block. The base station determines a preferred PRACH signal. The base station sends a RAR to the UE using the transmit beam of the preferred SS block. The RAR indicates the preferred PRACH signal and an uplink resource allocation. The UE receives the RAR and transmits a message using the transmit beam of the preferred PRACH signal and the uplink resource allocation.

44 Claims, 15 Drawing Sheets

(51) Int. Cl.
*H04W 56/00* (2009.01)
*H04W 72/04* (2009.01)
*H04W 74/00* (2009.01)

(56) References Cited

U.S. PATENT DOCUMENTS

| | | | |
|---|---|---|---|
| 2017/0251460 A1* | 8/2017 | Agiwal | H04W 72/0406 |
| 2018/0049245 A1* | 2/2018 | Islam | H04B 7/0619 |
| 2018/0279135 A1* | 9/2018 | Hwang | H04W 74/08 |
| 2018/0279380 A1* | 9/2018 | Jung | H04W 74/0833 |
| 2018/0324853 A1* | 11/2018 | Jeon | H04W 74/08 |
| 2018/0343595 A1* | 11/2018 | da Silva | H04J 11/0073 |
| 2019/0132066 A1* | 5/2019 | Park | H04W 36/0094 |
| 2019/0150190 A1* | 5/2019 | Kim | H04W 74/0833 |
| | | | 370/329 |
| 2019/0254077 A1* | 8/2019 | Sahlin | H04L 5/0037 |
| 2020/0008245 A1* | 1/2020 | Yan | H04W 36/08 |
| 2020/0154376 A1* | 5/2020 | Ko | H04W 76/11 |
| 2020/0187159 A1* | 6/2020 | Ko | H04L 5/0051 |
| 2020/0296765 A1* | 9/2020 | Kim | H04W 74/0833 |

OTHER PUBLICATIONS

Interdigital Inc., "Multiple Msg1 transmissions for one monitored RAR window", 3GPP TSG-RAN WG1 #89, R1-1708992, Hangzhou, P.R. China, May 15-19, 2017, 3 pages.
Huawei et al., "Analysis of RACH Procedural Steps", #GPP TSG RAN WG2 Meeting #98, R2-1705192, Hangzhou, China, May 15-19, 2017, 7 pages.
International Preliminary Report dated Dec. 17, 2019, in PCT Patent Application No. PCT/2018/037860.

* cited by examiner

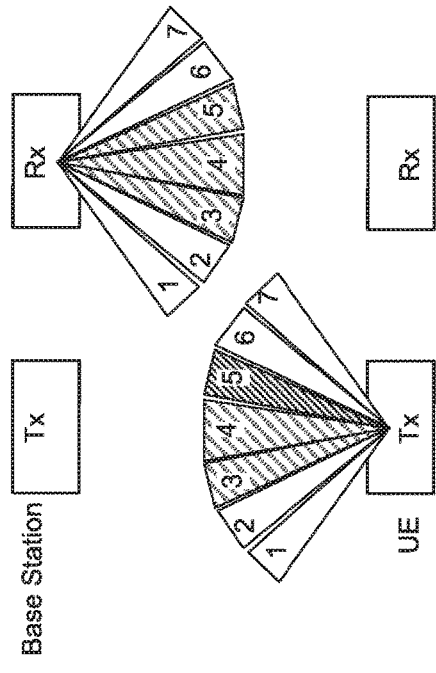
FIG. 4B  Step 2: PRACH Transmission and Reception
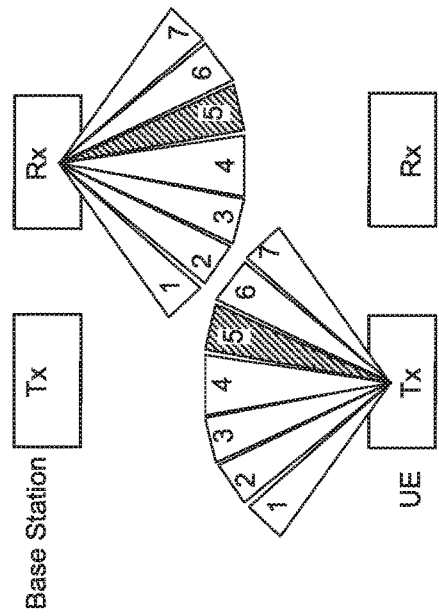
FIG. 4D  Step 4: Message 3 Transmission and Reception
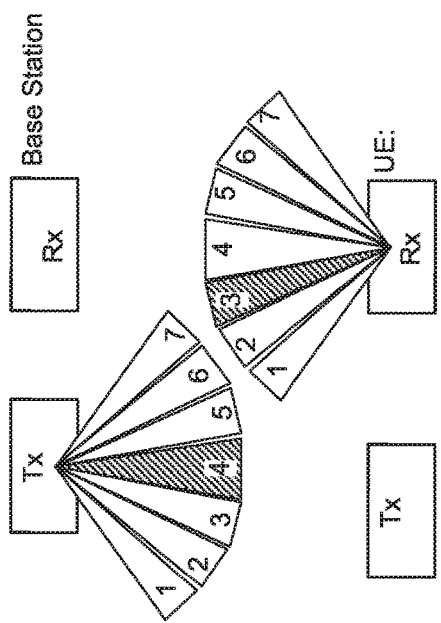
FIG. 4A  Step 1: SS Block Transmission and Reception. UE identifies best received SS block.
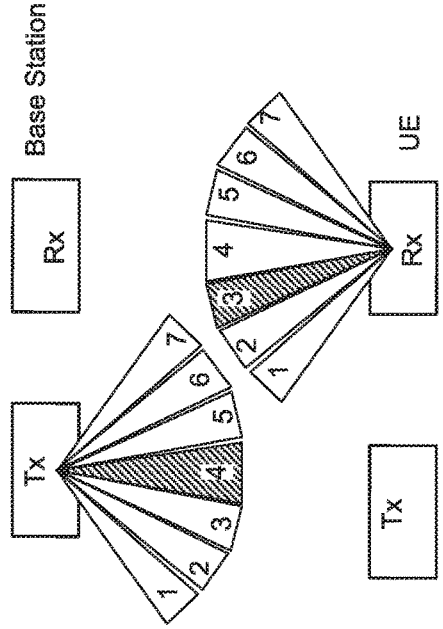
FIG. 4C  Step 3: RAR Transmission and Reception

RADIO COMMUNICATIONS USING RANDOM ACCESS IN WIRELESS NETWORKS

CLAIM FOR PRIORITY

This application claims the benefit of priority to U.S. Provisional Appl. No. 62/521,216, filed Jun. 16, 2017, the contents of which are hereby incorporated by reference.

FIELD

This application generally relates to wireless communications, including radio communications using random access procedures.

BACKGROUND OF THE INVENTION

Wireless radio links connect mobile phones and other devices to cellular networks, which also connect to the internet, providing basic voice communications and a wide variety of other services such as short messaging, email, internet access and other business applications. The radio coverage of a typical mobile phone application varies from a few hundred meters in small cell applications to several miles in macro-cell applications in rural areas. Wireless local area networks, referred to as "WiFi," enable portable computing devices such as laptop and smart phones to connect seamlessly to the internet. The coverage of WiFi is up to a hundred meters. Bluetooth is a wireless technology with even smaller coverage up to 10 meters. Bluetooth technology is widely used in mobile phones for wireless connection between peripheral devices and a mobile device nearby.

Wireless communication systems at each side of the radio link, regardless of coverage sizes, typically have at least one transmitter antenna and at least one receiver antenna. Typical antenna configurations include receiver diversity (two or more receiving antennas), transmitter beamforming (two or more transmitting antennas), and MIMO (Multiple Input and Multiple Output) (multiple transmitter and receiver antennas).

In mobile phone communications, one side of the communication link is a mobile station or user equipment while the other side is a base station. In the GSM-based 3GPP family, both GMSK (2G) and EDGE (2.5G) use receiver antenna diversity, while WCDMA (3G) and LTE (4G) use beamforming and/or MIMO. GMSK/EDGE typically involves time division multiple access (TDMA) (physical layer link) technology, WCDMA uses code division multiple access (CDMA) technology, and LTE uses orthogonal frequency division multiple access (OFDMA) technology for the downlink and single channel-frequency division multiple access (SC-FDMA) technology for the uplink.

Communication systems that utilize the microwave and millimeter-wave bands (e.g., 6 GHz to 100 GHz) are being designed as part of the ongoing 5G effort. Communication signals at such high frequencies are subject to very high path-loss. In order to overcome the high path-loss, beamforming techniques are used. Since beam-forming focuses transmitted energy into a narrow beam, only receivers within the angular span of the beam are able to receive the transmitted signal.

SUMMARY

According to one aspect of the present disclosure, there is provided a method of wireless network communication that includes: transmitting a plurality of physical random access channel (PRACH) signals from a client device, each PRACH signal is transmitted using a different transmit beam; receiving from a base station a random access response (RAR), the RAR indicating a first PRACH signal of the plurality of PRACH signals and an uplink resource allocation; and transmitting a message from the client device using the uplink resource allocation and the transmit beam corresponding to the first PRACH signal.

Optionally, in any of the preceding aspects, each PRACH signal in the plurality of PRACH signals carries a random access preamble selected from a range of random access preambles, wherein the range of random access preambles corresponds to a first synchronization signal block received by the client device.

Optionally, in any of the preceding aspects, the random access preamble carried by each PRACH signal of the plurality is the same.

Optionally, in any of the preceding aspects, the random access preamble carried by each PRACH signal of the plurality is different.

Optionally, in any of the preceding aspects, the method further comprises: receiving a plurality of synchronization signal blocks including the first synchronization signal block; and receiving an indication of a range of random access preambles corresponding to at least one synchronization signal block of the plurality of synchronization signal blocks.

Optionally, in any of the preceding aspects, each PRACH signal comprises a random access preamble; and the RAR includes an identifier of the random access preamble corresponding to the first PRACH signal.

Optionally, in any of the preceding aspects, receiving the indication of the range of random access preambles corresponding to the at least one synchronization signal block comprises: receiving the indication in the synchronization signal block.

Optionally, in any of the preceding aspects, receiving the indication of the range of random access preambles corresponding to the at least one synchronization signal block comprises: receiving the indication in a system information message.

Optionally, in any of the preceding aspects, a random access preamble is selected for transmission on each of the PRACH signals in the plurality of PRACH signals from the range of random access preambles corresponding to a synchronization signal block received by the client device.

Optionally, in any of the preceding aspects, the method further comprises: determining a first synchronization signal block received with a highest signal quality; wherein receiving a random access response further comprises receiving the random access response from a receive beam direction which is the same as a receive beam direction corresponding to the first synchronization signal block.

Optionally, in any of the preceding aspects, a random access preamble selected for transmission on a first PRACH signal in the plurality of PRACH signals is selected based on an index of the first PRACH signal.

Optionally, in any of the preceding aspects, the first PRACH signal is determined by the base station to have a highest signal quality of the PRACH signals.

Optionally, in any of the preceding aspects, the method further comprises detecting by the client device a synchronization signal block having a corresponding random access channel (RACH) occasion including a plurality of PRACH occasions; and selecting a subset of PRACH occasions of the RACH occasion based on a receive beam on which the synchronization signal is received, the subset of PRACH occasions including less than a total number of the plurality of PRACH occasions; wherein transmitting the plurality of PRACH signals comprises transmitting the plurality of PRACH signals in the subset of PRACH occasions.

According to one aspect of the present disclosure, there is provided a device, comprising: a non-transitory memory storage comprising instructions; and one or more processors in communication with the memory, wherein the one or more processors execute the instructions to: transmit a plurality of physical random access channel (PRACH) signals from a client device, each PRACH signal is transmitted using a different transmit beam; receive from a base station a random access response (RAR), the RAR indicating a first PRACH signal of the plurality of PRACH signals and an uplink resource allocation; and transmit a message from the client device using the uplink resource allocation and the transmit beam corresponding to the first PRACH signal.

According to one aspect of the present disclosure, there is provided a non-transitory computer-readable medium storing computer instructions for wireless network communication, that when executed by one or more processors, cause the one or more processors to perform the steps of: transmit a plurality of physical random access channel (PRACH) signals from a client device, each PRACH signal is transmitted using a different transmit beam; receive from a base station a random access response (RAR), the RAR indicating a first PRACH signal of the plurality of PRACH signals and an uplink resource allocation; and transmit a message from the client device using the uplink resource allocation and the transmit beam corresponding to the first PRACH signal.

According to one aspect of the present disclosure, there is provided a device, comprising: an antenna configured to receive one or more synchronization signal blocks; and one or more processors in communication the antenna, the one or more processors configured to transmit a plurality of physical random access channel (PRACH) signals from a client device, each PRACH signal is transmitted using a different transmit beam, the one or more processors configured to receive from a base station a random access response (RAR), the RAR indicating a first PRACH signal of the plurality of PRACH signals and an uplink resource allocation, the one or more processors configured to transmit a message from the client device using the uplink resource allocation and the transmit beam corresponding to the first PRACH signal.

According to one aspect of the present disclosure, there is provided a method at a base station for random access, comprising: receiving, via a set of receive beams, a sequence of PRACH signals, wherein each PRACH signal in the sequence of PRACH signals includes a random access preamble; identifying a first PRACH signal, wherein the first PRACH signal is received via a first receive beam; transmitting a random access response to a client device, wherein the random access response indicates the first PRACH signal, and wherein the random access response allocates a transmission resource; and receiving, via the first receive beam, a message transmitted by the client using the allocated transmission resource.

Optionally, in any of the preceding aspects, identifying the first PRACH signal comprises determining that the first PRACH signal has a highest signal quality of the sequence of PRACH signals.

Optionally, in any of the preceding aspects, each PRACH signal includes a same random access preamble.

Optionally, in any of the preceding aspects, each PRACH signal includes a different random access preamble.

Optionally, in any of the preceding aspects, the method further comprises: transmitting a synchronization signal block using a first transmit beam; wherein receiving the sequence of PRACH signals comprises receiving the sequence of PRACH signals in a RACH occasion corresponding to the synchronization signal block; and wherein transmitting the random access response comprises transmitting the random access response using the first transmit beam.

Optionally, in any of the preceding aspects, the method further comprises identifying by the base station that the synchronization signal block is a preferred synchronization signal block received by the client device based on receiving the sequence in the RACH occasion corresponding to the synchronization signal block.

Optionally, in any of the preceding aspects, the method further comprises transmitting a plurality of synchronization signal blocks, each synchronization signal block is transmitted using a different transmit beam; wherein receiving the sequence of PRACH signals comprises receiving the sequence of PRACH signals in a RACH occasion corresponding to the plurality of synchronization signal blocks; determining a first RACH preamble carried by the first PRACH signal; determining by the base station that a first synchronization signal block is a preferred synchronization signal block received by the client device based on the RACH occasion and the first RACH preamble; identifying a first transmit beam used for the first synchronization signal block; wherein transmitting the random access response comprises transmitting the random access response using the first transmit beam.

According to one aspect of the present disclosure, there is provided a device, comprising: a non-transitory memory storage comprising instructions; and one or more processors in communication with the memory, wherein the one or more processors execute the instructions to: receive, via a set of receive beams, a sequence of PRACH signals, wherein each PRACH signal in includes a random access preamble; identify a first PRACH signal, wherein the first PRACH signal is received via a first receive beam; transmit a random access response to a client device, wherein the random access response indicates the first PRACH signal, and wherein the random access response allocates a transmission resource; and receive, via the first receive beam, a message transmitted by the client using the allocated transmission resource.

According to one aspect of the present disclosure, there is provided a non-transitory computer-readable medium storing computer instructions for wireless network communication, that when executed by one or more processors, cause the one or more processors to perform the steps of: receive, via a set of receive beams, a sequence of PRACH signals, wherein each PRACH signal in includes a random access preamble; identify a first PRACH signal, wherein the first PRACH signal is received via a first receive beam; transmit a random access response to a client device, wherein the random access response indicates the first PRACH signal, and wherein the random access response allocates a transmission resource; and receive, via the first receive beam, a message transmitted by the client using the allocated transmission resource.

According to one aspect of the present disclosure, there is provided a method at a base station for random access, comprising: receiving, via a set of receive beams, a sequence of PRACH signals wherein each PRACH signal in the sequence of PRACH signals comprises a same random access preamble; identifying a first PRACH signal, wherein the first PRACH signal is received via a first receive beam; transmitting a random access response to a client device, wherein the random access response indicates the first PRACH signal, and wherein the random access response allocates a transmission resource; and receiving, via the first receive beam, a message transmitted by the client using the allocated transmission resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 4A-4D are block diagrams depicting an example of random access procedure in accordance with one embodiment.

DETAILED DESCRIPTION

Figure 1A:
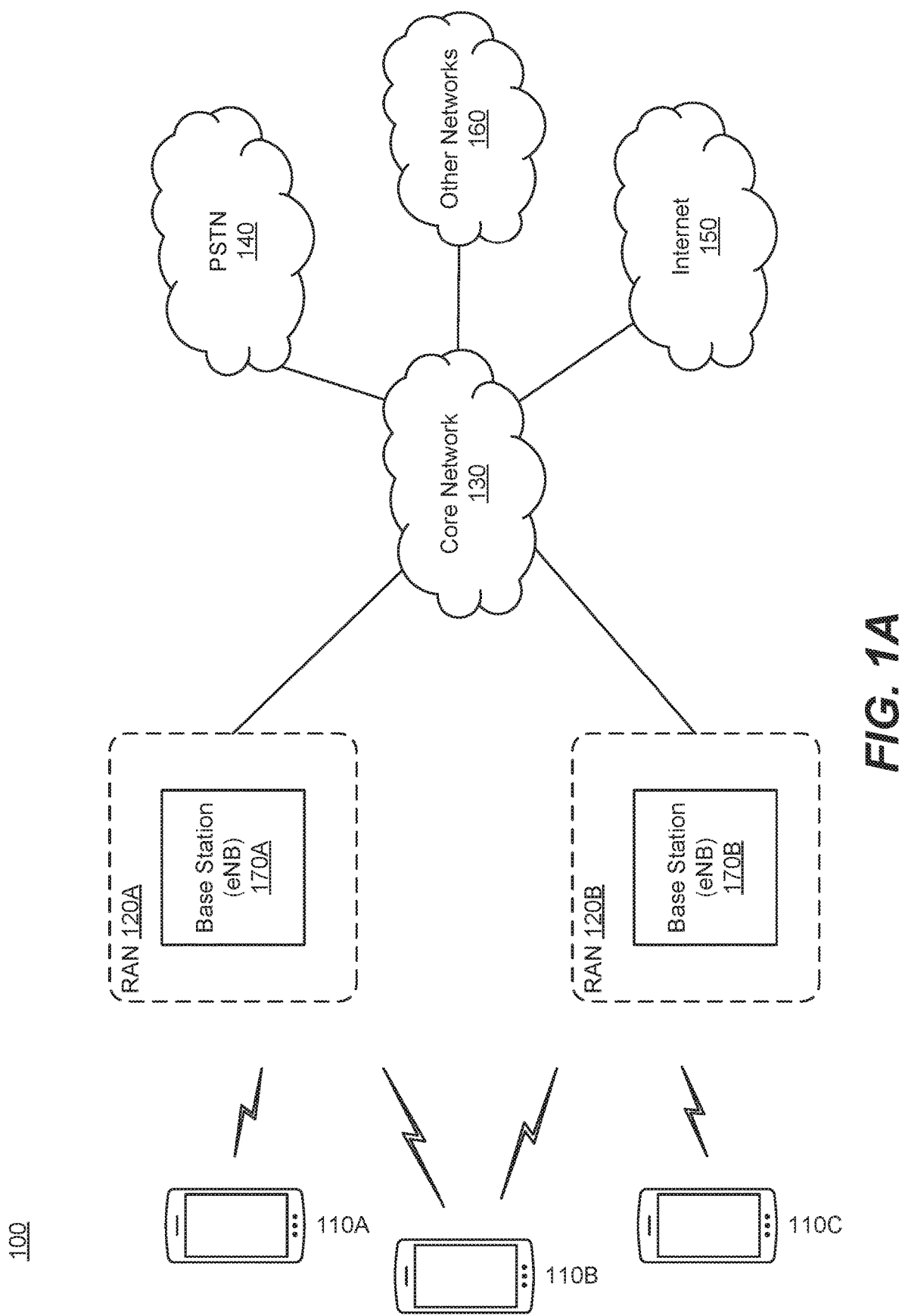
FIG. 1A is a block diagram of a network communication environment.

The disclosure relates to technology for wireless communications, including but not limited to 5G radio communications using random access procedures in which micro- and millimeter wavers are utilized. In a random access system, the user equipment (UE) sends random access channel (RACH) signals and receives a random access response (RAR) in order to establish a connection with a base station. An efficient random access procedure is provided for reduced control overhead associated with establishing a connection in a random access system. The disclosed technology may be used in microwave and millimeter-wave spectrum wireless systems, but is not so limited. In one embodiment, the disclosed technology is used with beamformed transmissions that are used to overcome higher path losses. Beam forming may be applied not only to user equipment (UE) specific downlink and uplink data transmissions, but also to common channels such as synchronization and control channels on the downlink and random access channels in the uplink.

In one embodiment, a base station transmits one or more synchronization signal (SS) blocks. A UE detects a one or more SS blocks and determines a preferred SS block. The UE transmits multiple random access signals such as multiple physical random access channel (PRACH) signals in a random access resource (e.g., RACH occasion) following the SS block. Each PRACH signal is transmitted on a different beam and includes a random access (e.g. RACH) preamble. The preamble for each PRACH signal may be the same or different. The base station receives one or more of the PRACH signals. The RACH occasion and optionally the RACH preamble identify to the base station which SS block was the preferred SS block received at the UE. The base station identifies the preferred SS block, and also determines a preferred PRACH signal from the one or more PRACH signals that are received. For example, the base station may select the PRACH signal having the best signal quality. The base station sends a RAR to the UE using the same transmit beam on which the preferred SS block was transmitted. The RAR indicates the preferred PRACH signal and an uplink resource allocation. The UE receives the RAR and transmits a message using the transmit beam of the preferred PRACH signal and the uplink resource allocation.

By determining a preferred PRACH signal, the base station can issue a single RAR in response to multiple PRACH signals from one UE. The RAR indicates the preferred PRACH signal received at the base station so the UE knows the preferred transmit beam on which to transmit a response to the RAR (referred to as message 3) to the base station. In this manner, the number of RARs issued by the base station may be reduced, while also reducing the uplink resource allocations and message 3 transmissions that are made. Additionally, the preferred transmit beam for sending a message from the UE is identified by the preferred received PRACH signal.

A base station in accordance with the disclosed technology may not have to respond to every PRACH signal by issuing a RAR and providing an uplink resource allocation for each RAR. The base station determines the preferred PRACH signal of a sequence of PRACH signals from a UE.

The base station transmits a RAR only for the preferred PRACH signal in one embodiment. Additionally, the RAR indicates the preferred PRACH signal that was received by the base station. In this manner, the UE identifies the preferred PRACH signal from the RAR and is able to transmit a message on the same transmit beam as the preferred received PRACH signal.

Methods described here are also applicable to coverage enhanced devices. In LTE, a coverage enhanced device typically receives multiple copies of a signal in order to boost the signal to noise ratio of the received signal. Likewise, a device may transmit multiple copies of a signal in order to improve likelihood of detection. In addition, the RACH procedure may involve transmitting at open power level, and then at another if a response is not received.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a wireless network for communicating data. The communication system 100 includes, for example, user equipment (UE) 110A-110C, radio access networks (RANs) 120A-120B, a core network 130, a public switched telephone network (PSTN) 140, the Internet 150, and other networks 160. While certain numbers of these components or elements are shown in the figure, any number of these components or elements may be included in the system 100.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The UEs 110A-110C are configured to operate and/or communicate in the system 100. For example, the UEs 110A-110C are configured to transmit and/or receive wireless signals or wired signals. The UE 110 may have a processor, a memory (which may or may not be non-transitory), a transceiver, and an antenna (not shown). In particular embodiments, some or all of the functionality described herein as being provided by the UE may be provided by the UE processor executing instructions stored on the memory. Alternative embodiments of the UE may include additional components that may be responsible for providing certain aspects of the UE's functionality, including any of the functionality necessary to support the embodiments of the present disclosure.

Each UE 110A-110C represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device. A UE may be referred to as a client device.

In the depicted embodiment, the RANs 120A-120B include base stations 170A, 170B (collectively, base stations 170), respectively. Each of the base stations 170 is configured to wirelessly interface with one or more of the UEs 110A, 110B, 110C (collectively, UEs 110) to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a Home NodeB, a Home eNodeB, a site controller, an access point (AP), or a wireless router, or a server, router, switch, relay or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the base stations 170 and UEs 110 are configured to implement the Long Term Evolution wireless communication standard (LTE), LTE Advanced (LTE-A), and/or LTE Broadcast (LTE-B). In other embodiments, the base stations 170 and UEs 110 are configured to implement UMTS, HSPA, or HSPA+ standards and protocols. Of course, other multiple access schemes and wireless protocols may be utilized.

The RANs 120A-120B are in communication with the core network 130 to provide the UEs 110 with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

Together, the core network 130 and the base stations 170 are one embodiment of a wireless network.

It is contemplated that the system 100 may use multiple channel access functionality, including such schemes as described above. In particular embodiments, the base stations 170 and UE 110 are configured to implement the Long Term Evolution wireless communication standard (LTE), LTE Advanced (LTE-A), 5G and/or LTE Broadcast (LTE-B). The base stations and UE may be configured to implement LTE-unlicensed (LTE-U) or License assisted access LTE (LAA-LTE). The base stations and UEs may be configured to implement Wi-Fi. In other embodiments, the base stations and UEs are configured to implement UMTS, HSPA, or HSPA+ standards and protocols. Note that a mix of any of these schemes and wireless protocols may be used. Of course, other multiple access schemes and wireless protocols may be utilized.

The RANs may also include millimeter and/or microwave access points. The access points may be part of the base stations are may be located remote from the base stations. The APs may include, but are not limited to, a connection point (a mmW CP) or a base station capable of mmW communication (e.g., a mmW base station). The mmW APs may transmit and receive signals in a frequency range, for example, from 6 GHz to 100 GHz, but are not required to operate throughout this range. The term base station is used to refer to a base station and/or a wireless access point.

Wireless communication signals in these high frequency ranges may suffer from high path loss. Beamforming may be used to overcome such losses. Beamforming focuses transmitted energy into a narrow beam, as described above. Both the APs and the UE 110 may use beamforming to communicate with each other. Also, the base stations 170 and the APs may use beamforming to communicate with each other. The APs, the UE 110, and at least some of the base stations 170 may have a phased-array beam antenna for beamforming. A transmitting and a receiving device can only communicate with each other when the phased array beam antennas of the transmitting and receiving device are mutually aligned. The beamwidths of mutually aligned transmit and receive beams have some overlap.

Although FIG. 1 illustrates one example of a communication system, various changes may be made to FIG. 1. For example, the communication system 100 could include any number of UEs, base stations, networks, or other components in any suitable configuration.

In communications systems, such as those described with reference to FIG. 1 and the various embodiments disclosed herein, a transmit beam is used to focus transmitted energy into a narrow spatial direction. A receive beam is used to receive energy from a narrow spatial direction and suppress energy from other directions. Beam-forming refers to the signal processing used to generate the directional beams, and can be applied to both the transmit and the receive side. By focusing the energy in a desired direction, beam-forming enables significant gains in signal strength in desired directions. Simultaneously, it also reduces interference in a network by suppressing energy in directions other than the desired directions.

A beam is formed by combining antenna elements in an antenna array in such a way that that particular (desirable) directions experience constructive interference while other directions experience destructive interference. In particular, a beam-former controls the phase and amplitude of the signal at each antenna element in order to create a desired pattern for the antenna. The antenna elements can be arranged in several ways: for example, several antenna elements can be arranged in one row to form a linear array; or antenna elements can be placed in a rectangular grid to form a panel.

Figure 1B:
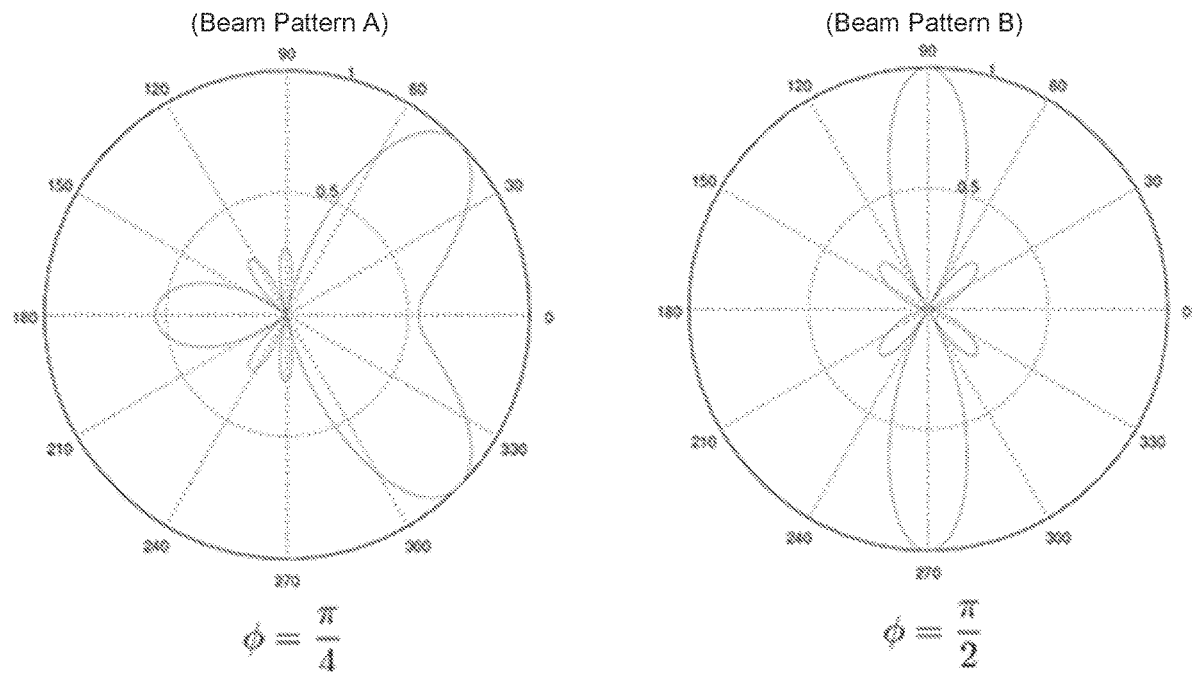
FIG. 1B illustrates beam patterns obtained by applying a phase shift to an antenna array.

FIG. 1B illustrates beam patterns obtained by applying a phase shift to an antenna array. In particular, and as an example, beam-forming using phase shifts at each element of a linear antenna array is illustrated. The equation below shows a vector of phase shifts, referred to as the spatial signature:

$$e_t(\phi_t) = \frac{1}{\sqrt{n_t}} \begin{bmatrix} 1 \\ e^{-j2\pi \Delta_t \cos(\phi_t)} \\ e^{-j2\pi \Delta_t \cos(\phi_t)} \\ \vdots \\ e^{-j2\pi(n_t-1)\Delta_t \cos(\phi_t)} \end{bmatrix},$$

where $\Delta_t$ defines the spacing between antenna elements in the antenna array in units of carrier wavelength, $\phi_t$ defines the angle between the line of sight of from the transmitter to the receiver and the bore-sight of the antenna element and $n_t$ defines the number of antenna elements. The 2-dimensional beam pattern that is obtained by applying the above phase shifts to an antenna array comprising 4 isotropic antenna elements is shown, where the left-most diagram (Beam Pattern A) in FIG. 1B shows the beam pattern when $\phi_t$ is 45 degrees and the right-most diagram (Beam Pattern B) in FIG. 1B sows the beam pattern when $\phi_t$ is 90 degrees.

Figure 1C:
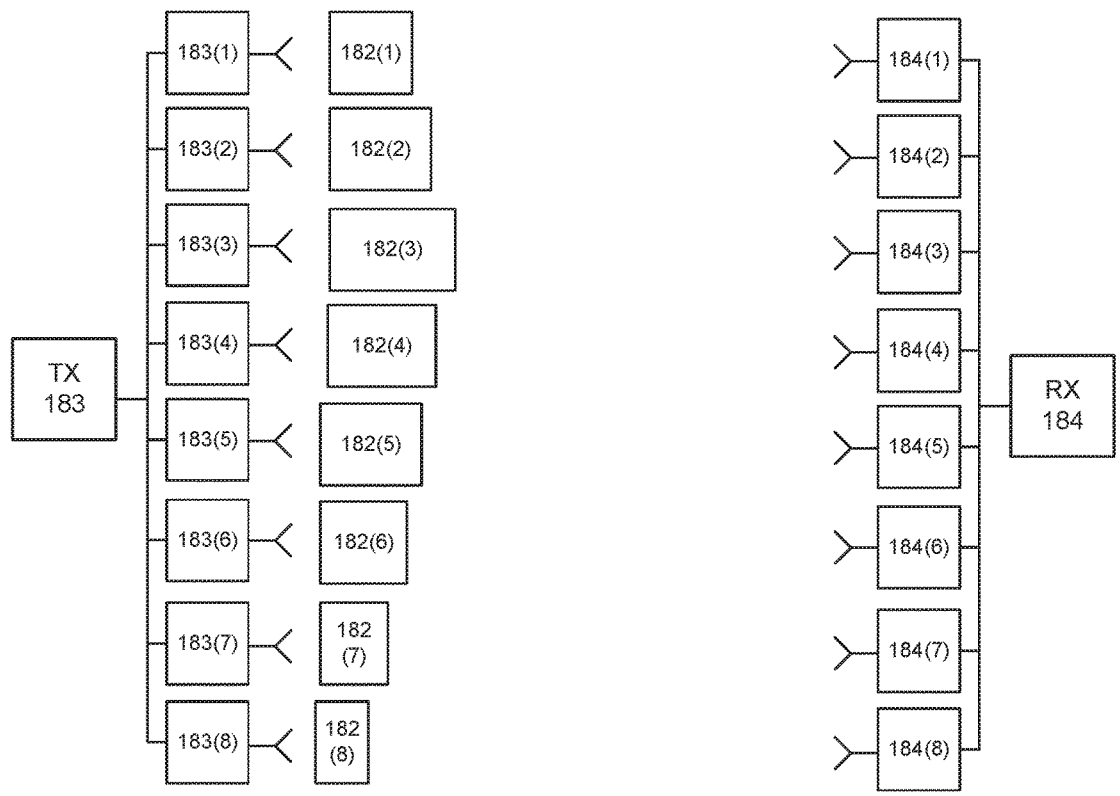
FIG. 1C illustrates beam forming using different weights assigned to antenna elements in an antenna array.

FIG. 1C illustrates beam forming using different weights assigned to antenna elements in an antenna array. The transmitter 183 is attached to an array of antenna elements 183(1)-183(8). Different weights 182(1)-182(8) are applied to transmissions from the antenna elements to obtain a desired antenna pattern. As appreciated, the weights may be adjusted as necessary to obtain the desired antenna patterns, and are not limited to the depicted embodiment. The transmitted beams may then be received at the receiver 184, which likewise includes a number of antenna elements 184(1)-184(8). It is appreciated that the number of transmitter and receiver antenna elements is not limited to eight (8), and may include more or less antenna elements.

Before establishing a communication link with a base station and/or access point, a UE 110 generally performs cell acquisition and synchronization. The cell acquisition step typically involves receiving a synchronization signal from base station. In a high frequency wave band, beamforming may be applied to synchronization signals (otherwise, the distance at which the synchronization signal can be received is much smaller than the distance at which the beam-formed data channels can be received). If the synchronization signals are beam-formed, only UEs 110 that are within the narrow angle covered by the beam are able to receive the synchronization signal. Thus, the base station may perform "transmit beam sweeping" to ensure the UE 110 has a chance to receive the synchronization signal. Transmit beam sweeping refers to rotating the direction of the beam transmission to cover all directions. Moreover, the UE 110 may need to rotate the direction in which it searches for the synchronization signal in order for the phased-array beam antennas of the base station 170 and UE 110 to be mutually aligned (referred to as "receive beam sweeping"). Thus, the sweeping procedures can take a significant amount of time and introduce significant delays in the cell acquisition step.

The cell acquisition and synchronization becomes even more complicated if the UE 110 is moving, as the direction of arrival of the synchronization signal beam keeps changing. Also, the UE 110 may try to locate multiple base stations to identify multiple cells suitable for service. Sweeping procedures to identify a group of base stations can mean a substantial increase in the cell acquisition duration.

At higher frequencies (e.g., microwave and millimeter-wave spectrum), beam-formed transmissions are an important feature to overcome higher path losses. Beam-forming may be applied to UE specific downlink and uplink data transmissions, and also to common channels such as synchronization and control channels on the downlink and random access channels on the uplink.

For random access, the UE performs a beam-formed transmission of a PRACH (physical random access channel) and expects a Random access response (RAR) message in response to the PRACH transmission. The base station (e.g., gNB) performs beam-formed reception of the PRACH, and in the RAR message allocates resources for a further uplink transmission by the UE. The use of beam-formed transmission and beam-formed reception implies that the UE's transmit beam may not be well aligned with the base station's reception beam. The misalignment can cause a lower signal quality and the PRACH transmission may not be correctly detected at the base station. The PRACH transmission is sometimes referred to as "message 1" and the RAR transmission is referred to as "message 2".

Although not so limited, random access is often used in cellular networks for initial access from an idle state, handover between base stations, downlink data arrival after a period of inactivity, uplink data arrival after a period of inactivity, uplink timing realignment, and connection reestablishment after a radio link failure.

The antenna arrangements at the base station and at the UE allow beam-forming, and therefore there can be a number of directions of transmission and of reception at each of the base stations and the UE. There may be m1 directions for reception at the UE and n1 directions for transmission. The system may find the best pairs among the m1 reception directions and n1 transmission directions such that if a signal is received from the base station from a particular receive direction, a corresponding transmit direction to transmit to the base station can be identified.

In a random access system, the UE sends random access channel (RACH) signals and receives a random access response (RAR) in order to establish a connection with a base station. The UE could transmit a RACH signal and wait for a specified duration for a RAR. The UE could retransmit the RACH signal using a different beam if does not receive the RAR.

Beam correspondence refers to the reciprocity between uplink and downlink beams. If a base station or UE is able to determine the transmit beam to use based on the received beam, then it may be said to have beam correspondence. If the transmit and receive paths share antenna elements, beam correspondence may exist. However, this may cause switching losses. If transmit and receive paths use different antenna elements, in general beam correspondence depends on the physical separation between transmit and receive antenna elements. Small separations generally ensure beam correspondence. The duplex mode also affects beam correspondence. With time division duplex (TDD), beam correspondence can be expected. However, for very wide bands, if the portion of the spectrum used for reception is far from the portion of the spectrum used for transmission, beam correspondence may not exist.

In a multi-beam architecture for millimeter or microwave operation, for example beam correspondence may not be able to be assumed.

In the absence of beam-correspondence at the UE and the gNB, the random access procedure may use multiple PRACH transmissions, and also multiple random access responses (RAR) and multiple resulting messages from the UE (e.g., message 3s). A UE may perform multiple RACH signal transmissions in multiple directions (i.e., using multiple RACH beams) one after another before it receives a RAR. This may result in significant delay.

Instead, the UE may transmit a series of physical random access channel (PRACH) signals within a single occasion in different directions on different beams. This can provide a high probability of at least one of the PRACH signals being received at the base station. The UE then awaits an RAR. The base station detects one or more of the PRACH signals and transmits a RAR with an uplink resource allocation.

Because the UE transmits multiple PRACH signals, the base station may detect multiple PRACH signals. If multiple PRACH signals are detected, the base station responds to each signal and therefore sends multiple RARs. Each RAR consumes control channel resources. If UEs transmit multiple PRACH signals resulting in multiple RAR transmissions, a large control channel overhead may be experienced. Additionally, each RAR allocates uplink resources. The UE only needs and utilizes one uplink resource allocation; thus the allocation of uplink resources in each RAR leads to wasted resource allocations.

The base station procedure may include detecting the PRACH signal and transmitting a RAR with an uplink resource allocation. If the UE transmits multiple PRACH signals, the base station may detect more than one of the PRACH signals transmitted by the UE. The base station will then send an RAR in response to each PRACH detected from the UE. Responding to multiple PRACH signals from a UE may be wasteful. Each RAR consumes control channel resources. If a few UEs transmit multiple RACHs and multiple RARs are to be transmitted, there can be a large control channel overhead. Additionally, each RAR allocates uplink resources. The UE needs only one UL resource allocation such that the others allocations may be wasted.

In accordance with one embodiment, a base station forms an association between synchronization signal (SS) blocks and random access resources and/or preambles. The base station can configure multiple RACH occasions. In one example, the association between SS blocks and RACH occasions can be a one-to-one mapping such that each SS block maps to a single RACH occasion. In another example, the association is such that multiple SS blocks map to a single RACH occasion. The association between the SS blocks and the PRACH resources can enable the UE to indicate to the base station a preferred SS block. For example, the preferred SS block may be the SS block received at the UE with the highest quality. This enables the base station to identify a downlink beam for transmission of the random access response.

In one embodiment, the base station configures a preamble space to create an association between SS blocks and the random access preambles. Each SS block is associated with a subset of the preamble range in one example. In one embodiment, each RACH occasion has multiple PRACH resources.

Figure 2:
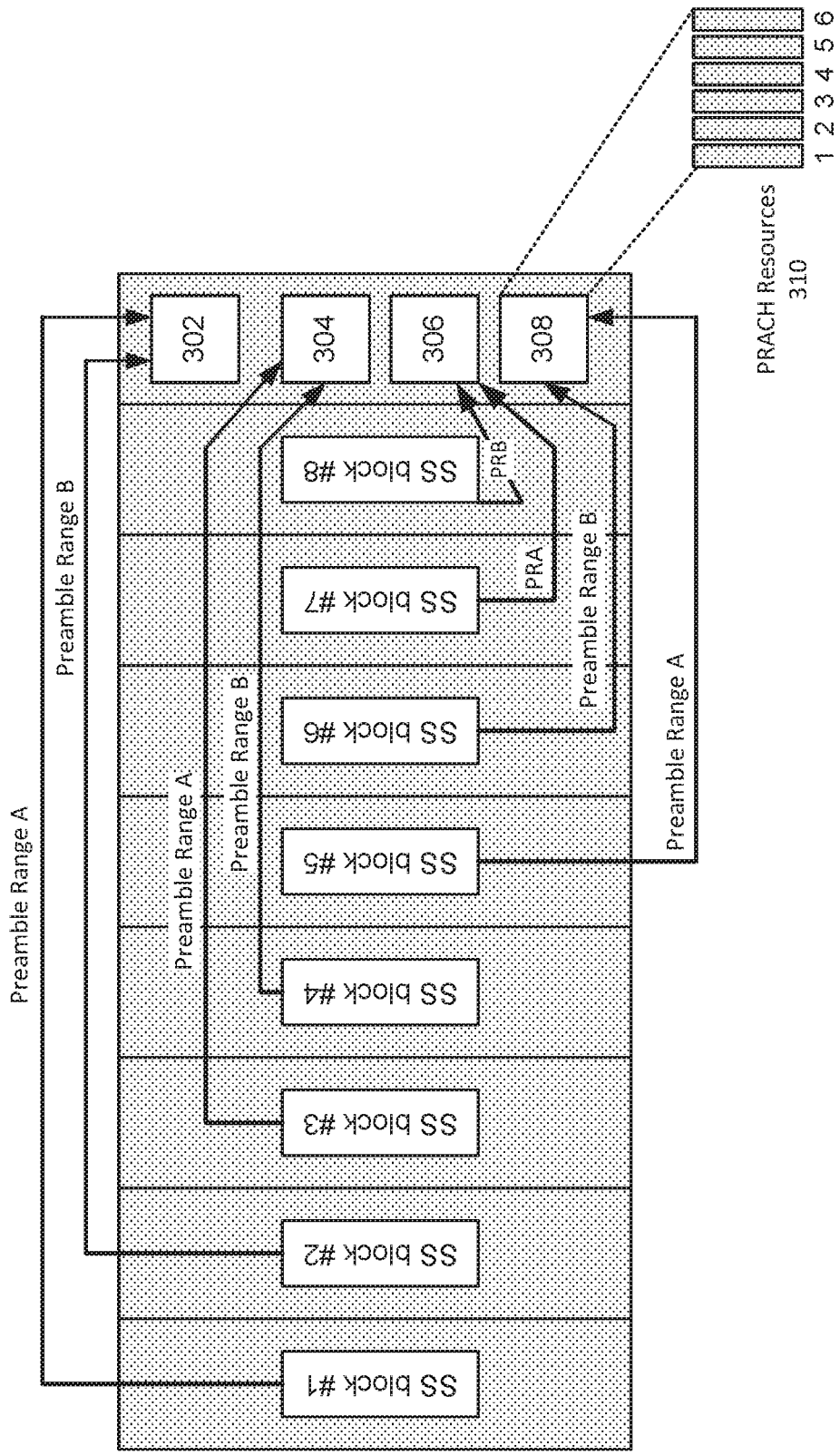
FIG. 2 is a block diagram depicting an example of a mapping of synchronization signal (SS) blocks and random access resources in accordance with one embodiment.

One example of an association of SS blocks to random access resources and preambles is shown in FIG. 2. In this example, eight synchronization and signal (SS) blocks (SS block #1-SS block #8) are shown. Each SS block (SS block #1-SS block #8) may be transmitted by a base station, such as base station 170A or 170B, in a different transmit beam (note the transmit beams may overlap partially). Each SS block (SS block #1-SS block #8) maps to one of four random access resources 302-308, such as one RACH occasion. In this manner, two SS blocks are associated with each random access resource 302-308, as illustrated. For example, SS block #1 and SS block #2 are associated with random access resource 302. To differentiate between the individual blocks at each random access resource 302-308, the preamble space assigned to the SS blocks (SS block #1-SS block #8) is divided into two ranges—preamble range A and preamble range B. Each SS block is (SS block #1-SS block #8) additionally associated with one of the two preamble ranges, preamble A or preamble B. Based on the random resource block 302-308 used by a UE in a PRACH signal, and the preamble range carried by the PRACH signal, the particular SS block (SS block #1-SS block #8) to which the PRACH signal corresponds can be determined.

FIG. 2 further illustrates that each random access resource block includes multiple physical random access channel resources. A UE may transmit a PRACH signal on one or more PRACH resources 310 corresponding to a particular random access resource 302-308 for an SS block (SS block #1-SS block #8).

In one embodiment, the association between the SS blocks (SS block #1-SS block #8) and the PRACH resources 310 can enable a UE to indicate to the base station a preferred SS block from the SS blocks (SS block #1-SS block #8) received at the UE (e.g., with the best quality). By indicating to the base station the preferred SS block received, the base station can identify a downlink beam for transmission of the random access response.

Figure 3:
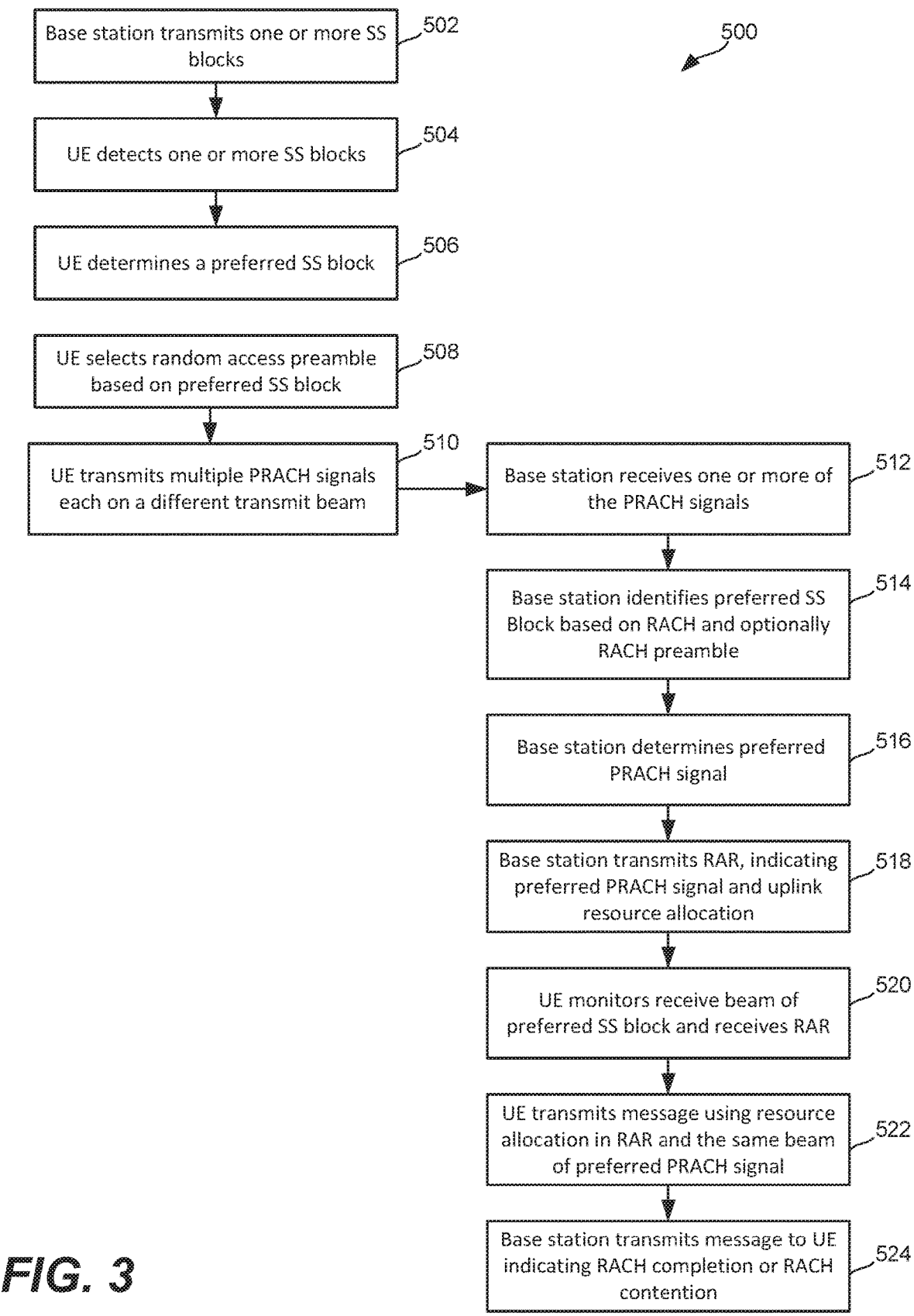
FIG. 3 is a flowchart describing a process for random access communication in accordance with one embodiment.

FIG. 3 is a flowchart describing a process 500 for a random access procedure in accordance with one embodiment. Process 500 may be performed in the environment of FIG. 1. Process 500, however, is not limited to being performed in such an environment. Process 500 may be performed by various elements in FIG. 1, such as a UE and base station as described. Process 500, however, is not limited to being performed by such elements as alternate or additional elements may be used. In one embodiment, process 500 may be performed by one or more processors, one or more antennas, and/or one or more dedicated circuits. Process 500 may be implemented as processor readable code for programming one or more processors.

At step 502, a base station transmits one or more SS blocks. Each SS block is transmitted on a transmit beam. At step 504, a UE detects one or more of the transmitted SS blocks. At step 506, the UE determines a preferred SS block if multiple SS blocks are detected. In one embodiment, step 506 includes determining a best SS block. The best SS block may be the SS block having the best signal quality or signal strength. In one embodiment, the UE determines the block having the highest reference signal received power (RSRP). A UE can monitor and measure the RSRP of each received SS block. In one embodiment, step 506 includes determining if the signal strength of a detected SS block is sufficient (e.g., above a minimum level). If a detected block has a sufficient signal strength, it may be considered the best received SS block. In one embodiment, the preferred SS block is an SS block that is received via a preferred beam by the UE.

At step 508, the UE selects a random access preamble (e.g., RACH preamble) based on an association between the SS blocks and RACH occasions and preambles. In one embodiment, step 508 includes selecting one random access preamble for every PRACH signal. In another example, step 508 includes selecting a different random access preamble for each PRACH signal.

At step 510, the UE transmits multiple PRACH signals. Each PRACH signal carries the selected random access preamble(s). At step 512, the base station receives one or more of the PRACH signals.

At step 514, the base station identifies the preferred SS block as determined by the UE. The base station identifies the preferred SS block based on the random access resource (e.g., RACH). The base station may additionally use a random access preamble to identify the preferred SS block.

At step 516, the base station determines a preferred PRACH signal from the received PRACH signals. In one embodiment, the base station determines a PRACH signal having a highest RSRP. The base station can monitor and measure the RSRP of each received PRACH signal.

At step 518, the base station transmits a single RAR in response to the one or more PRACH signals received at step 512. The RAR indicates the preferred PRACH signal PRACHn and an uplink resource allocation for a message (e.g., message 3) transmission from the UE. The base station transmits the RAR on the same transmit beam that was used to transmit the SS block identified as the preferred SS block by the UE. The RAR can optionally include the random access preamble corresponding to the preferred PRACH signal.

At step 520, the UE monitors for a RAR using the same receive beam used for the preferred SS block. The UE receives a RAR on the receive beam. From the RAR, the UE identifies the preferred PRACH signal from the multiple PRACH signals transmitted by the UE, as well as the uplink resource allocation.

At step 522, the UE transmits a message using the uplink resource allocation identified in the RAR. The UE uses the same transmit beam that was used to transmit the preferred PRACH signal identified in the RAR.

At step 524, the base station receives the message from the UE on the same beam that the preferred PRACH signal was received. The base station transmits a message to the UE indicating that the RACH procedure was completed successfully or that there was a RACH contention. A RACH contention may exist where the base station receives two or more RACH preambles in the same RACH occasion. In such a case, the indication of contention is received by the UE which can restart the RACH procedure.

FIGS. 4A-4D are block diagrams depicting an example of a random access procedure according to one embodiment. FIGS. 4A-4D depict a transmitter Tx and a receiver Rx at both a base station and a user equipment (UE), and a sequence of transmission between the two devices.

FIG. 4A depicts transmission of one or more SS blocks from the base station. For example, the base station may transmit seven SS blocks using seven transmit beams labeled 1-7. The receiver at the user equipment monitors for SS blocks on receive beams labeled 1-7. In the example of FIG. 5A, the UE receives an SS block on receive beam 3 that is determined to be a preferred SS block. The SS block is transmitted by the base station on transmit beam 4

FIG. 4B depicts transmission of PRACH signals from the UE and reception at the base station. The UE selects a RACH preamble corresponding to the preferred SS block, and transmits multiple PRACH signals using different transmit beams. If the preferred SS block has a one-to-one mapping to the RACH occasion used for the PRACH signals, then the RACH occasion will indicate to the base station the preferred SS block. If multiple SS blocks map to one RACH occasion, the RACH preamble will indicate to the base station the preferred SS block. In an alternate example, the UE may select multiple RACH preambles and transmit a different RACH preamble in each PRACH signal.

In FIG. 4B, the UE transmits three PRACH signals using transmit beams 3, 4, and 5. The UE may select transmit beams 3, 4, and 5 based on their directional correspondence with receive beam 3 on which the preferred SS block was received. The three PRACH signals are received on receive beams 3, 4, and 5 of the base station. The base station determines a preferred PRACH signal PRACHn from among the three PRACH signals. In one example, the preferred PRACH signal is the PRACH signal having the highest signal quality. The PRACH signal having the highest signal quality may be determined based on the PRACH signal having the highest RSRP. The base station determines that the preferred PRACH signal is the signal received on receive beam 5.

FIG. 4C depicts transmission of a random access response (RAR) from the base station to the UE. The base station generates a RAR which includes an indication of an uplink resource allocation (including one or more uplink resources) for a message (e.g., message 3) from the UE. The RAR also includes an indication of the preferred PRACH signal. The RAR can optionally include the random access preamble corresponding to the preferred PRACH signal. The base station transmits the RAR using the transmit beam corresponding to the preferred SS block. The base station identifies the preferred SS block based on the random access resource used to send the PRACH signals. If multiple SS blocks map to the random access resource, the base station uses the random access preamble to identify the preferred SS block. The base station determines the preferred SS block based on a predefined mapping of a subset of preambles including the preamble of the PRACH signal to the preferred SS block.

FIG. 4D depicts transmission of a message (e.g., message 3) from the UE to the base station. The UE uses the uplink resources identified in the RAR. Additionally, the UE transmits the message using the transmit beam that was used to transmit the preferred PRACH signal. As shown in FIG. 4D, the base station receives the message on receive beam 4, the same beam that was used to receive the preferred PRACH signal.

Figure 5:
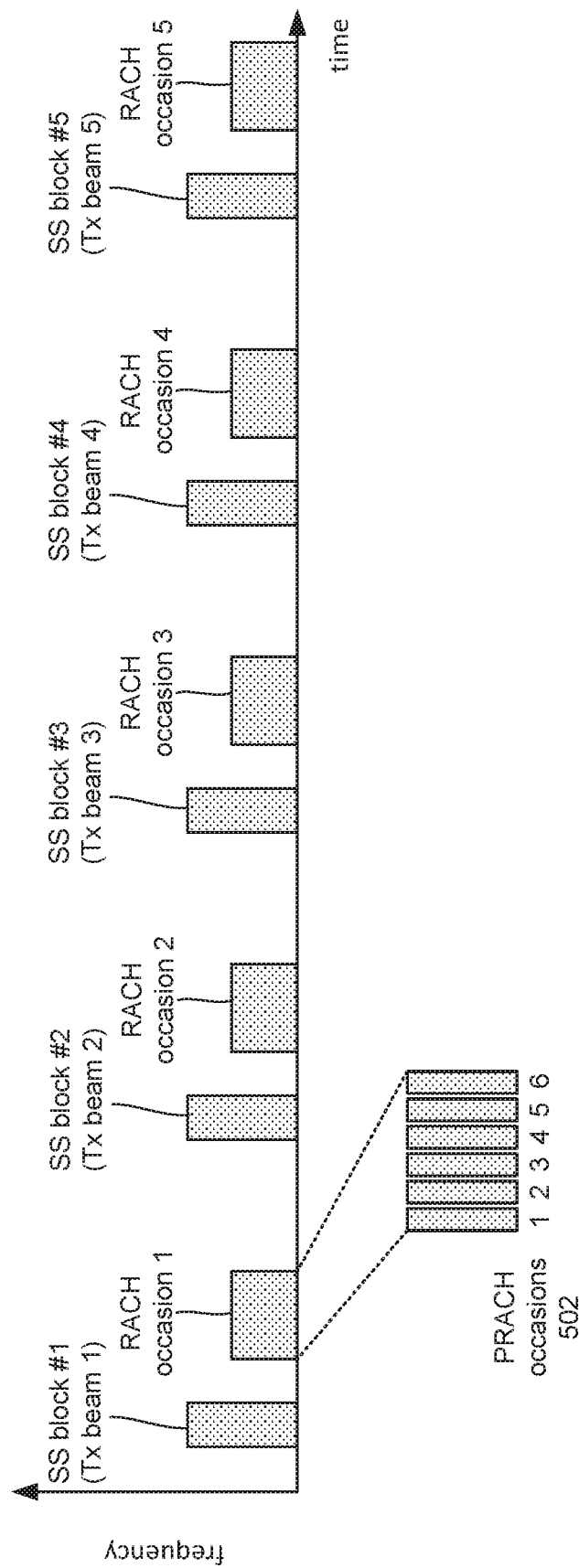
FIG. 5 is a block diagram depicting an example of a one-to-one mapping of synchronization signal (SS) blocks and random access resources in accordance with one embodiment.

FIG. 5 depicts another example of an association of SS blocks to random access resources and preambles. In this example, each SS block (SS block #1-SS block #5) is followed by one random access channel (RACH) resource. As shown in FIG. 5, each RACH resource includes multiple physical random access channel (PRACH) resources. For example, RACH occasion 1 follows SS block #1. SS block #1 is transmitted using Tx beam 1. RACH occasion 1 includes six (6) PRACH occasions 502. RACH occasion 2 follows SS block #2 which is transmitted using Tx beam 2. RACH occasion 3 follows SS block #3 which is transmitted using Tx beam 3. RACH occasion 4 follows SS block #4 which is transmitted using Tx beam 4. RACH occasion 5 follows SS block #5 which is transmitted using Tx beam 5.

A UE performing random access in this example first detects a preferred SS block (i.e., PSS, SSS, and PBCH). The UE transmits a RACH preamble in one or more of the PRACH resources 310 following the preferred SS block. The UE uses different transmit beams to transmit a RACH preamble on different PRACH resources. The UE may transmit a PRACH signal on all of the PRACH resources 310 for the RACH occasion (RACH occasion 1-5) in one embodiment. In another embodiment, the UE may transmit a PRACH signal on a subset of the PRACH resources 310 (Tx beam 1-5). For example, the UE may transmit a PRACH signal on those transmit beams (Tx beam 1-5) having a directional correspondence to the receive beam on which the preferred SS block was received.

In this example, the PRACH resources 310 do not overlap in time. For example, PRACH occasions 502 can occupy successive OFDM symbols in a slot. As mentioned earlier, there may not be a guaranteed beam correspondence in various wireless implementations. As shown in FIG. 5, the UE is able to respond to one SS block (e.g., a preferred SS block) by transmitting PRACH signals over multiple transmit beams (Tx beam 1-5).

With the structure shown in FIG. 5, a PRACH signal received by the base station, such as base station 170A or 170B, indicates to the base station the preferred SS block. The PRACH signal is received in a RACH occasion (RACH occasion 1-5) having a one-to-one correspondence with the preferred SS block. The base station can monitor for PRACH signals in multiple directions (e.g., using multiple receive beams). In one example, the base station can monitor for PRACH signals using different panels for each beam direction. If multiple panels are used, receive beam sweeping at the base station can be avoided. In one example, the number of panels used for simultaneous PRACH signal monitoring determines the number of PRACH occasions 502 in a RACH occasion (RACH occasion 1-5).

FIG. 5 depicts an example where RACH occasions are arranged in a time-division multiplexed (TDM) manner. In another example, the RACH occasions (RACH occasion 1-5) are arranged in a frequency-division multiplexed (FDM) manner. Different SS blocks (SS blocks #1-SS blocks #5) may correspond to RACH occasions (RACH occasion 1-5) with different frequency offsets. A one-to-one mapping between an SS block (SS block #1-SS block #5) and a RACH occasion (RACH occasion 1-5) is provided based on frequency.

FIG. 5 further illustrates that each random resource block includes multiple physical random access channel resources. A UE may transmit a PRACH signal on one or more PRACH resources 310 corresponding to a particular random access resource for an SS block (SS block #1-SS block #5).

In one embodiment, the association between the SS blocks (SS block #1-SS block #5) and the PRACH resources 310 can enable a UE to indicate to the base station a preferred SS block, such as the SS block (SS block #1-SS block #5) received at the UE with the highest signal strength or quality. By indicating to the base station the preferred SS block received, the base station can identify a downlink beam for transmission of the random access response.

Figure 6:
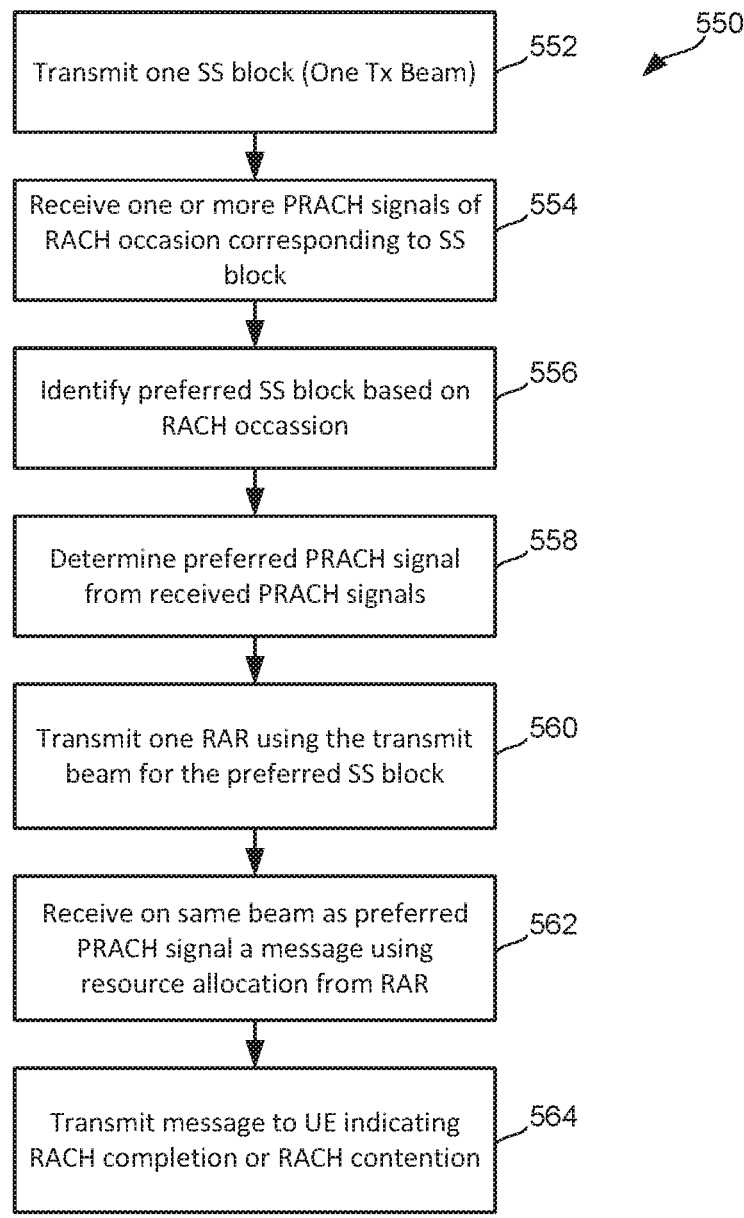
FIG. 6 is a flowchart describing a process for random access communication at a base station in accordance with the embodiment of FIG. 5.

FIG. 6 is a flowchart describing a process 550 performed by a base station in accordance with one embodiment. Process 550 describes an example where a one-to-one correspondence is provided between each SS block transmitted by the base station and each random access resource (e.g., RACH occasion).

Process 550 may be performed in the environment of FIG. 1, but is not limited to being performed in such an environment. Process 550 may be performed by various elements in FIG. 1, such as a base station as described. Process 550, however, is not limited to being performed by such elements as additional elements may be used. Process 550 may be performed by one or more processors, one or more antennas, and/or one or more dedicated circuits. Process 550 may be implemented as processor readable code for programming one or more processors.

At step 552, the base station transmits a single SS block. The SS block is transmitted on a transmit beam.

At step 554, the base station receives one or more PRACH signals of the random access resource corresponding to the SS block. At step 556, the base station identifies the SS block that corresponds to the random access resource. The base station identifies the SS block as the preferred SS block determined by the UE.

At step 558, the base station determines a preferred PRACH signal if multiple PRACH signals are received. The base station can determine the received PRACH signal having the highest signal quality (e.g., RSRP is the highest, largest correlation metric). Other factors may be used to determine a preferred PRACH signal.

At step 560, the base station transmits a RAR using the transmit beam that the base station used to transmit the preferred SS block. The RAR identifies the preferred PRACH signal determined by the base station. Additionally, the RAR identifies an uplink resource allocation for a message transmission from the UE.

At step 562, the base station receives a message from the UE on the same receive beam that the preferred PRACH signal was received. The message uses the uplink resource allocation that was identified in the RAR.

At step 564, the base station transmits a message to the UE in response to the message from the UE. If the message from the UE is successfully received and the RACH procedure is successfully completed, the base station transmits a RACH completion message. If the message is not processed, the base station transmits a RACH contention message. The RACH contention message can be transmitted if the base station receives multiple PRACH signals using the same RACH preamble in the same RACH occasion.

Figure 7:
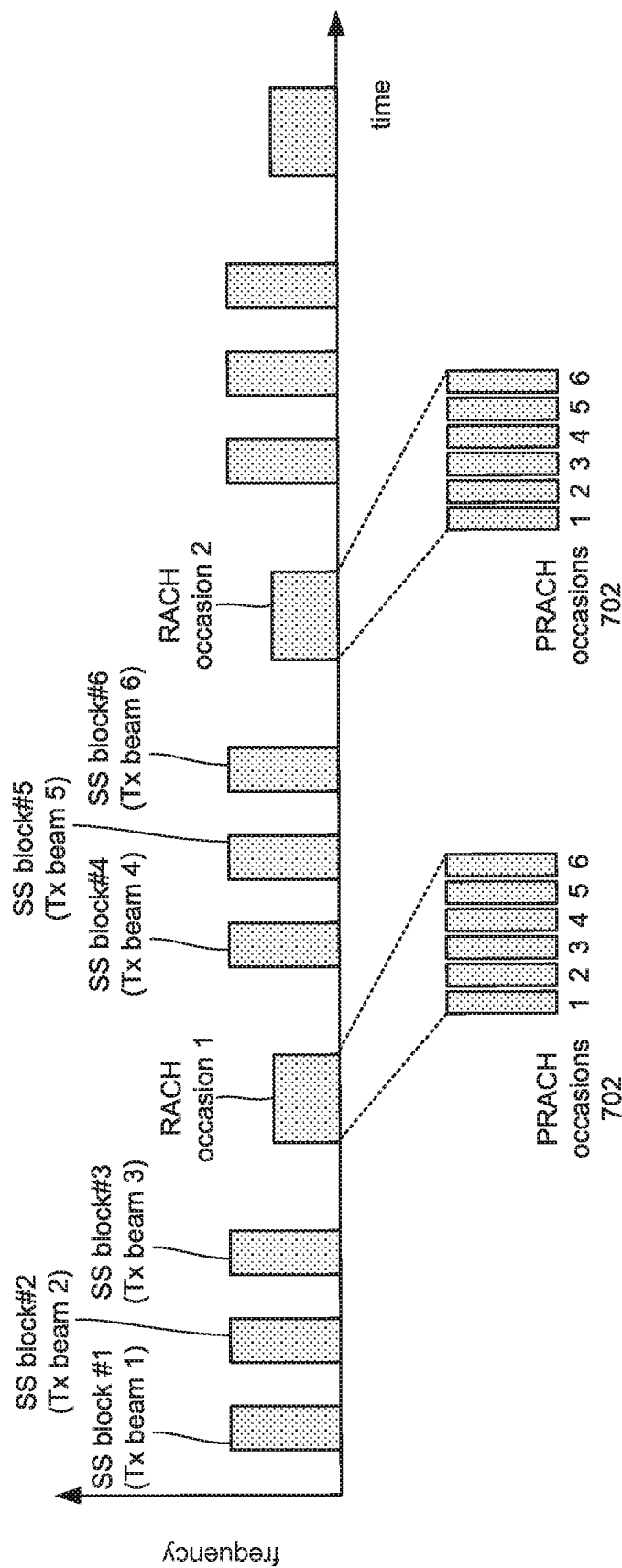
FIG. 7 is a block diagram depicting an example of a one-to-many mapping of synchronization signal (SS) blocks and random access resources in accordance with one embodiment.

FIG. 7 depicts another example of an association of SS blocks to random access resources and preambles. In this example, a random access channel resource (e.g., RACH occasion) is placed between groups of SS blocks. Each RACH access resource includes multiple physical random access channel (PRACH) resources. For example, RACH occasion 1 follows SS block #1, SS Block #2, and SS Block #3. SS block #1 is transmitted using Tx beam 1, SS block #2 is transmitted using Tx beam 2 and SS block #3 is transmitted using Tx beam 3. RACH occasion 1 includes six (6) PRACH occasions 702.

RACH occasion 2 follows SS block #4, SS block #5, and SS block #6. SS block #4 is transmitted using Tx beam 4, SS block #5 is transmitted using Tx beam 5 and SS block #6 is transmitted using Tx beam 6. RACH occasion 2 also includes siz (6) PRACH occasions 702.

A UE performing random access in this example first detects a preferred SS block (i.e., PSS, SSS, and PBCH) from a group of SS blocks (SS blocks #1-SS blocks #6). The UE transmits a RACH preamble in the RACH occasion (RACH occasion 1-2) following the group of SS blocks (SS blocks #1-SS blocks #6). The UE uses different transmit beams to transmit a RACH preamble on different PRACH resources 310 of the RACH occasion (RACH occasion 1-2). The UE may transmit a PRACH signal on all of the PRACH resources 310 for the RACH occasion (RACH occasion 1-2) in one embodiment. In another embodiment, the UE may transmit a PRACH signal on a subset of the PRACH resources 310. For example, the UE may transmit a PRACH signal on those transmit beams having a directional correspondence to the receive beam on which the preferred SS block was received.

As mentioned earlier, there may not be a guaranteed beam correspondence in various wireless implementations. As shown in FIG. 7, the UE is able to respond to one SS block (e.g., a preferred SS block) in the group of SS blocks (SS blocks #1-SS blocks #6) by transmitting PRACH signals over multiple transmit beams.

With the structure shown in FIG. 7, a PRACH signal received by the base station, such as base station 170A or 170B, indicates to the base station the preferred SS block (SS blocks #1-SS blocks #6). However, the RACH occasion (RACH occasion 1-2) alone does not indicate to the base station the preferred SS block received by the UE. The PRACH signal is received in a RACH occasion (RACH occasion 1-2) that does not have a one-to-one correspondence with the preferred SS block. The base station can monitor for PRACH signals in multiple directions (e.g., using multiple receive beams). In one example, the base station can monitor for PRACH signals using different panels for each beam direction. If multiple panels are used, receive beam sweeping at the base station can be avoided. In one example, the number of panels used for simultaneous PRACH signal monitoring determines the number of PRACH occasions in a RACH occasion (RACH occasion 1-2).

In order to identify the preferred SS block, the RACH preambles are divided into ranges. A distinct range of preambles is associated with each SS block. In one example, the SS block (SS blocks #1-SS blocks #6) transmitted by the base station can indicate (e.g., in the PBCH) the range of preambles corresponding to the SS block (SS blocks #1-SS blocks #6). In another example, the information about the ranges can be transmitted in a system information message sent independently of the SS block. Other techniques for informing a UE of preamble range to SS block (SS blocks #1-SS blocks #6) mapping can be used. The UE selects a RACH preamble from the corresponding range of the preferred SS block. The UE transmits the RACH preamble in each PRACH signal transmitted on the different transmit beams. In one embodiment, the UE selects a different RACH preamble for each PRACH signal. Each RACH preamble corresponds to the preferred SS block.

Figure 8:
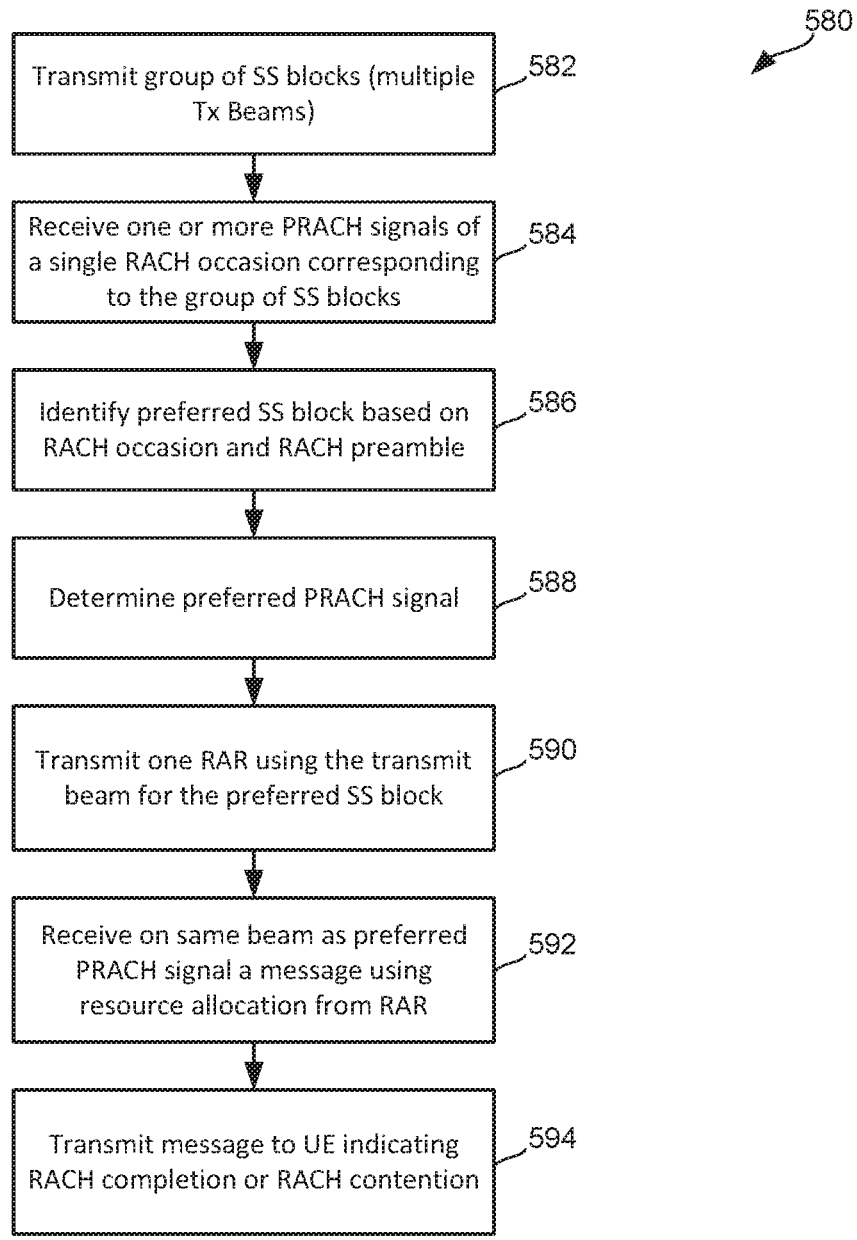
FIG. 8 is a flowchart describing a process for random access communication at a base station in accordance with the embodiment of FIG. 5.

FIG. 8 is a flowchart describing a process 580 performed by a base station in accordance with one embodiment. Process 580 describes an example where a one-to-one correspondence is not provided between each SS block transmitted by the base station and each random access resource (e.g., RACH occasion).

Process 580 may be performed in the environment of FIG. 1, but is not limited to being performed in such an environment. Process 580 may be performed by various elements in FIG. 1, such as a base station as described. Process 580, however, is not limited to being performed by such elements as additional elements may be used. Process 580 may be performed by one or more processors, one or more antennas, and/or one or more dedicated circuits. Process 580 may be implemented as processor readable code for programming one or more processors.

At step 582, the base station transmits a group of SS blocks. The SS blocks are transmitted using different transmit beams. Each SS block is transmitted prior to a RACH occasion corresponding to the group of SS blocks.

At step 584, the base station receives one or more PRACH signals of the random access resource corresponding to the group of SS blocks. At step 586, the base station identifies the preferred SS block determined by the UE in response to the group of SS blocks. The base station identifies the preferred SS block based on the RACH occasion on which the PRACH signal was received, and the RACH preamble included in the RACH occasion. The RACH preamble has a predefined correspondence to a particular one of the SS blocks.

At step 588, the base station determines a preferred PRACH signal if multiple PRACH signals are received. The base station can determine the received PRACH signal having the highest signal quality (e.g., RSRP is the highest). Other factors may be used to determine a preferred PRACH signal.

At step 590, the base station transmits a RAR using the transmit beam that the base station used to transmit the preferred SS block. The RAR identifies the preferred PRACH signal determined by the base station. Additionally, the RAR identifies an uplink resource allocation for a message transmission from the UE.

At step 592, the base station receives a message from the UE on the same receive beam that the preferred PRACH signal was received. The message uses the uplink resource allocation that was identified in the RAR.

At step 594, the base station transmits a message to the UE in response to the message from the UE, indicating a RACH completion or a RACH contention.

Figure 9:
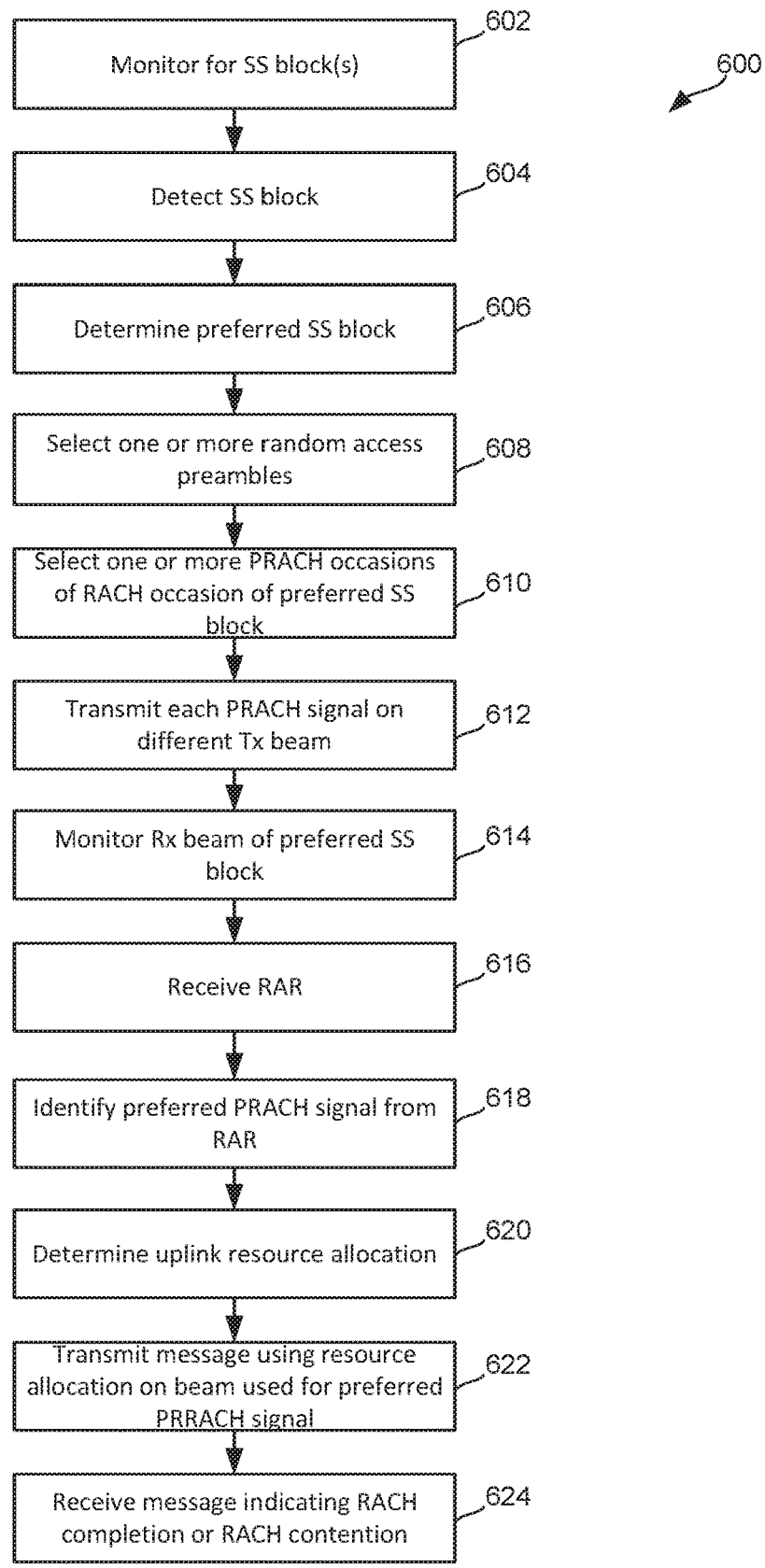
FIG. 9 is a flowchart describing a process at a client device for random access communication in accordance with one embodiment.

FIG. 9 is a flowchart describing a process 600 performed by a client device in accordance with one embodiment. Process 600 may be performed in the environment of FIG. 1, but is not limited to being performed in such an environment. Process 600 may be performed by various elements in FIG. 1, such as a UE as described. Process 600, however, is not limited to being performed by such elements as additional elements may be used. Process 600 may be performed by one or more processors, one or more antennas, and/or one or more dedicated circuits. Process 600 may be implemented as processor readable code for programming one or more processors.

At step 602, the UE monitors for one or more SS blocks. At step 604, the UE detects one or more SS blocks. At step 606, the UE determines a preferred SS block from the SS blocks detected at step 604. In one embodiment, the UE determines a SS block received with a highest signal strength. In one embodiment, the UE determines which SS block has a highest RSRP.

At step 608, the UE selects one or more random resource preambles (e.g., RACH preamble) from a range of preambles associated with the preferred SS block.

At step 610, the UE selects one or more PRACH resources of the RACH occasion for transmitting PRACH signals. The UE may use all or a subset of the PRACH resources of the corresponding RACH occasion. In one example, the UE selects a subset of the PRACH resources based on a directional correspondence with the receive beam on which the preferred SS block was received.

At step 612, the UE transmits each PRACH signal on a different transmit beam. Each PRACH signal includes a RACH preamble. In one example, each PRACH signal includes the same RACH preamble. In another example, each PRACH signal includes a different RACH preamble.

At step 614, the UE monitors the receive beam on which the preferred SS block was received. At step 616, the UE receives a RAR on the receive beam. At step 618, the UE identifies from the RAR the preferred PRACH signal as determined by the base station. At step 620, the UE determines one or more uplink resources identified by the uplink resource allocation. At step 622, the UE transmits a message (e.g., message 3) on the beam used for the transmitting the preferred PRACH signal. The UE uses the one or more uplink resources.

At step 624, the UE receives a message from the base station indicating RACH completion or RACH contention. If a RACH contention is reported, the UE can restart the RACH procedure.

Figure 10:
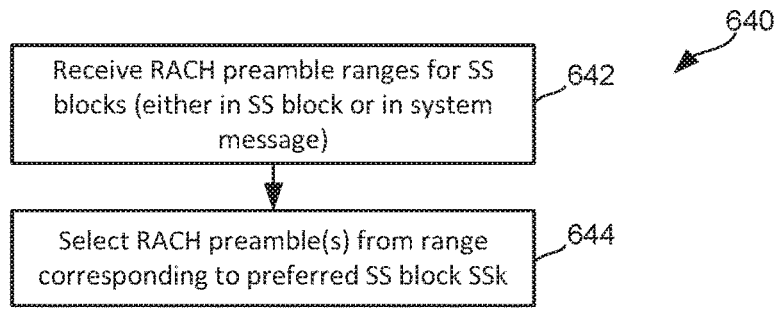
FIG. 10 is a flowchart describing a process of select a random access preamble in accordance with one embodiment.

FIG. 10 is a flowchart describing a process 640 for selecting a random access preamble (e.g., RACH preamble) for a PRACH signal. Process 640 may be performed in the environment of FIG. 1 using a UE. Process 640, however, is not limited to being performed in such an environment or by a UE. Process 640 may be performed as part of selecting one or more random access preambles as described in process 600 at step 608. Process 640 may be performed by a processor, one or more antennas, and/or one or more dedicated circuits. Process 640 may be implemented as processor readable code for programming a processor.

At step 642, a UE receives RACH preamble ranges for SS blocks. The RACH preamble ranges may be mapped to SS blocks. RACH preambles may be divided into ranges, with each range corresponding to a particular SS block. The UE may receive the range information from the SS block itself, or from a system information message sent independently of the SS block.

At step 644, the UE selects one or more random access preambles from the range corresponding to the preferred SS block. The UE can select one RACH preamble, for example, to be carried by each of the PRACH signals. In another option, the UE can select a different RACH preamble for each PRACH signal. Each RACH preamble corresponds to the preferred SS block.

Figure 11:
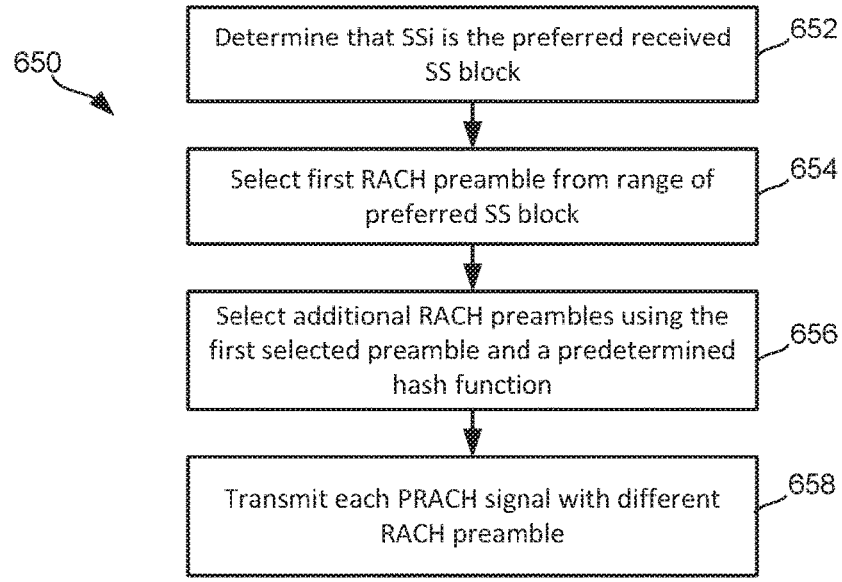
FIG. 11 is a flowchart describing a process of selecting multiple random access preambles in accordance with one embodiment.

FIG. 11 is a flowchart describing a process 650 for selecting different random access preambles (e.g., RACH preambles) for each PRACH signal. Process 650 may be performed in the environment of FIG. 1 using a UE. Process 650, however, is not limited to being performed in such an environment or by a UE. Process 650 may be performed as part of selecting RACH preambles as described in process 640 at step 644. Process 650 may be performed by a processor, one or more antennas, and/or one or more dedicated circuits. Process 650 may be implemented as processor readable code for programming a processor.

At step 652, the UE determines that an SS block SSi is a preferred SS block. Step 652 may include determining that SS block SSi was received with the best signal quality, however, other factors can be used. At step 654, the UE selects a first RACH preamble from a range of preambles corresponding to the preferred SS block.

For example, let $Pr(SS_i)$ denote the preamble range corresponding to the preferred SS block SSi. Then, let $PRACH_1, \ldots, PRACH_n$ denote the n PRACH occasions. The UE may select a first preamble $p_0 \in Pr(SS_i)$.

At step 656, the UE selects additional RACH preambles based on the first selected preamble using a predetermined hash function. The UE can then select preambles $p_1, p_2, \ldots, p_n \in Pr(SS_i)$ based on a hash function H that maps the PRACH index to preambles: $p_k = H(i, k, p_0)$.

At step 658, the UE transmits each PRACH signal using a different one of the selected RACH preambles.

Figure 12:
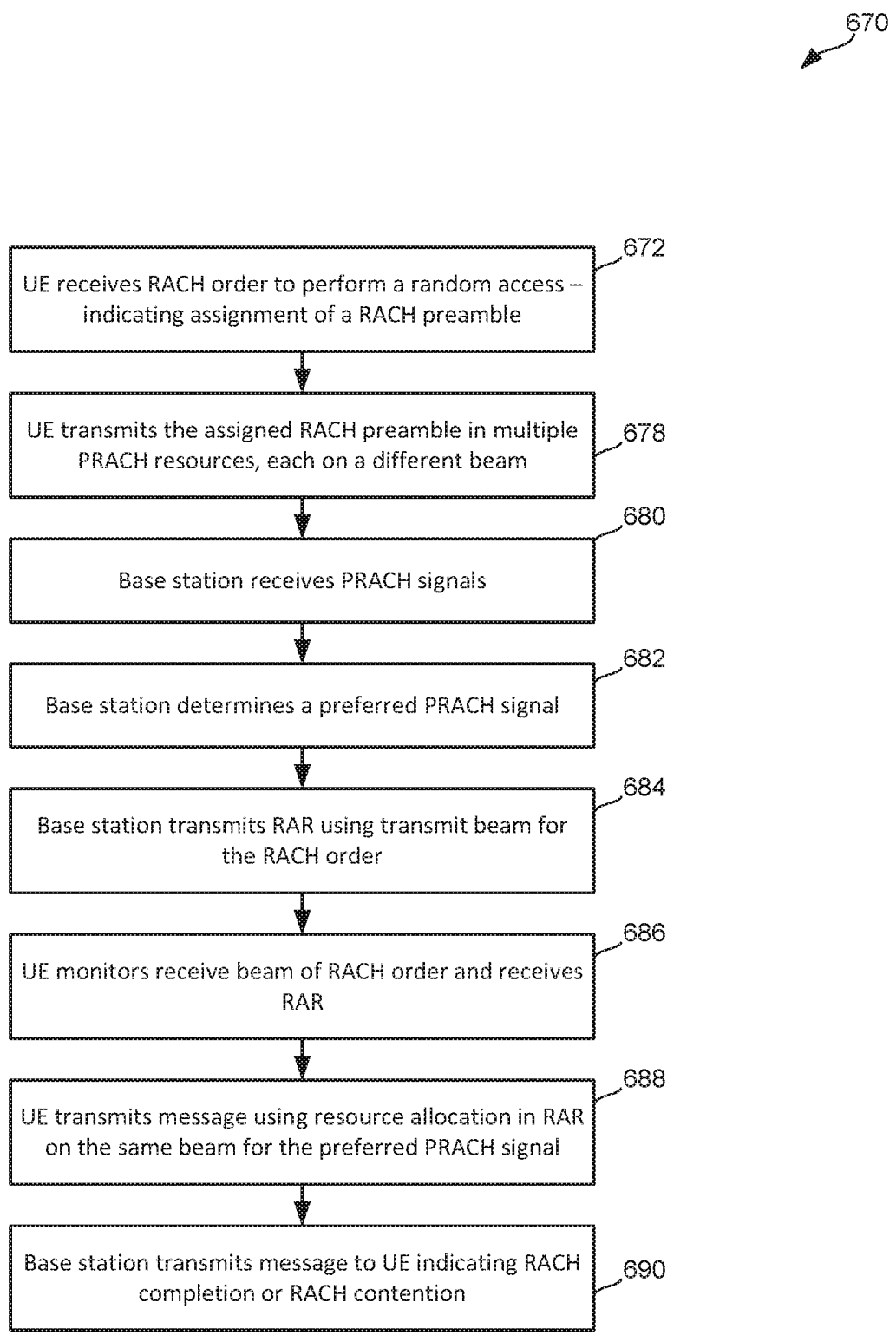
FIG. 12 is a flowchart describing a process of contention-free random access communication in accordance with one embodiment.

FIG. 12 is a flowchart describing a contention-free random access process 670 in accordance with one embodiment. A contention-free random access process may be performed after an initial connection between a UE and base station has been established. Process 670 may be performed in the environment of FIG. 1. Process 670, however, is not limited to being performed in such an environment. Process 670 may be performed by various elements of a UE or base station. Process 670 may be performed by a processor, one or more antennas, and/or one or more dedicated circuits. Process 670 may be implemented as processor readable code for programming a processor At step 672, the UE receives an order from a base station to perform random access. The order includes a random access preamble assignment (e.g., RACH preamble).

At step 678, the UE transmits the assigned RACH preamble in multiple PRACH signals. Each RACH preamble is transmitted in a PRACH resource on a different transmit beam. The PRACH preambles can be transmitted in a subset of the PRACH occasions that occur in the RACH occasion following the preferred received SS block.

At step 680, the base station receives one or more PRACH signals transmitted by the UE. At step 682, the base station determines a preferred PRACH signal from the one or more PRACH signals.

At step 684, the base station transmits a RAR using the transmit beam that was used to transmit the RACH order. The RAR indicates the preferred PRACH signal and also includes an uplink resource allocation. The uplink resource allocation is one or more uplink resources for a message 3 transmission by the UE.

At step 686, the UE monitors the receive beam on which the RACH order was received and receives the RAR from the base station. At step 688, the UE transmits a message (e.g., message 3) using the uplink resource allocation in the RAR. The UE determines the preferred PRACH signal identified in the RAR. The message is transmitted using the same beam used for transmitting the preferred PRACH signal.

At step 690, the base station transmits a RACH completion or a RACH contention message.

In one embodiment, the UE selects the RACH occasion based on the preferred received SS block and/or the preferred downlink beam. It is possible for contention to occur as earlier described. With the options depicted in FIG. 5, two UEs that detect the same SS block as the preferred SS block may select the same RACH preamble.

With the option depicted in FIG. 2 and FIG. 7, two UEs that detect the same SS block as the preferred SS block may select the same RACH preamble from the corresponding range. The possibility of contention may be higher as the range of preambles can be smaller than the entire allocated range.

When contention is observed by the base station, it can transmit an indication that contention has occurred. The UEs then restart the RACH procedure. Since the preamble is chosen randomly, the probability of contention occurring again is low.

Figure 13:
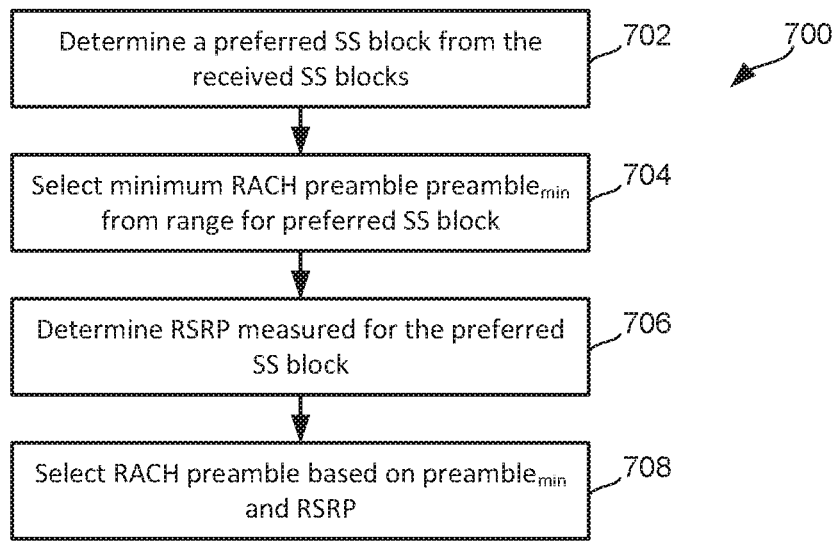
FIG. 13 is a flowchart describing a process of selecting a random access preamble to reduce the likelihood of contention.

In accordance with one embodiment, a process of selecting one or more RACH preambles to reduce the likelihood of contention is used. FIG. 13 is a flowchart describing a process 700 in accordance with one embodiment for selecting a RACH preamble. Process 700 may be performed as part of selecting RACH preambles as described in process 600 at step 608. Process 700 may be performed in the environment of FIG. 1. Process 700, however, is not limited to being performed in such an environment. Process 700 may be performed by various elements of a UE. Process 700 may be performed by a processor, one or more antennas, and/or one or more dedicated circuits. Process 700 may be implemented as processor readable code for programming a processor.

At step 702, the UE determines a preferred SS block from the received SS blocks. The UE may select the SS block with the highest signal strength, or from a preferred beam, for example. At step 704, the UE selects a minimum RACH preamble, preamble$_{min}$, from the range of preambles for the preferred SS block. At step 706, the UE determines the measured RSRP for the preferred SS block. At step 708, the UE selects a RACH preamble based on preamble$_{min}$ and the measured RSRP.

In one embodiment, the RSRP is mapped to the preamble range. For example, the selected preamble can be chosen as preamble$_{min}$+f(RSRP), where preamble$_{mini}$ denotes the lower end of the preamble range corresponding to the preferred SS block. If the option depicted in FIG. 5 is used, preamble$_{min}$ is preamble$_1$ and f(RSRP) maps the RSRP to the range 1 . . . N−1, where N is the number of preambles in the range. Assuming sufficiently different RSRPs at the two UEs, this scheme causes the UEs to select different preambles, thus avoiding contention.

Figure 14:
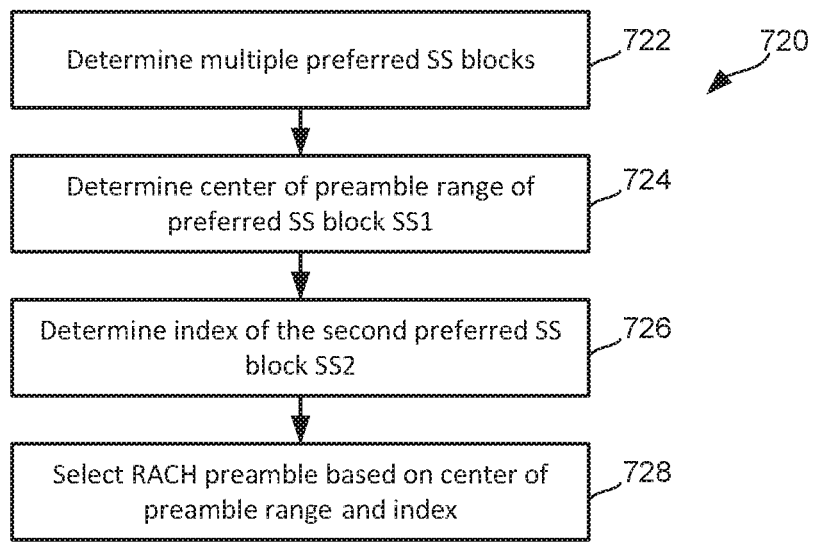
FIG. 14 is a flowchart describing a process of selecting a random access preamble to reduce the likelihood of contention.

In another example, instead of using a single preferred SS block to select the preamble, multiple SS blocks with the highest RSRPs can be used to select the preamble. FIG. 14 is a flowchart describing a process 720 in accordance with one embodiment for selecting a RACH preamble. Process 720 may be performed as part of selecting RACH preambles as described in process 600 at step 608. Process 720 may be performed in the environment of FIG. 1. Process 720, however, is not limited to being performed in such an environment. Process 700 may be performed by various elements of a UE. Process 720 may be performed by a processor, one or more antennas, and/or one or more dedicated circuits. Process 720 may be implemented as processor readable code for programming a processor.

At step 722, the UE determines multiple preferred SS blocks. For example, the UE may select the two SS blocks having the best signal quality (e.g., highest RSRP). At step 724, the UE determines the center of the preamble range corresponding to the first preferred SS block. At step 726, the UE determines an index of the second preferred SS block. At step 728, the UE selects a RACH preamble based on the center of the preamble range and the index. At step 728, the UE may map the SS block index to an integer.

For example, SS2 can be denoted as the index of the second preferred SS block and preamble$_{center}$ can be denoted as the center of the preamble range corresponding to the first preferred SS block. F(SS2) can then denote a mapping of the SS block index to an integer in the range [−range/2 . . . range/2]. The UE may select a preamble for the PRACH signal according to preamble$_{center}$+f(SS$_2$).

A timing advance can be based on the preferred received PRACH. Given that the preferred beam can change frequently, it may be beneficial to assign to the UE timing advances with respect to the presently preferred PRACH, but also PRACHs associated with other PRACHs from the UE that are detected by the base station. This can enable the UE to adjust the timing advance if it needs to switch the uplink beam.

In one embodiment, the RAR provides the timing advance based on not only the best PRACH, but also the 2nd best and so on. Table 1 illustrates an example of a timing advance according to one embodiment.

TABLE 1

| PRACH index | Timing advance |
| --- | --- |
| PRACH$_n$ | TA$_1$ |
| PRACH$_i$ | TA$_2$ |

In some cases, a RA-RNTI (radio network temporary identifier) has been used to identify a RACH occasion. For NR it may be useful to have different RA-RNTI's for different PRACHs within a RACH occasion. RAR reception will then provide that the UE monitor multiple RA-RNTIs based on the PRACH occasions that it used for transmissions. In some embodiments, the RA-RNTI can be a function of an SS block identifier.

Figure 15:
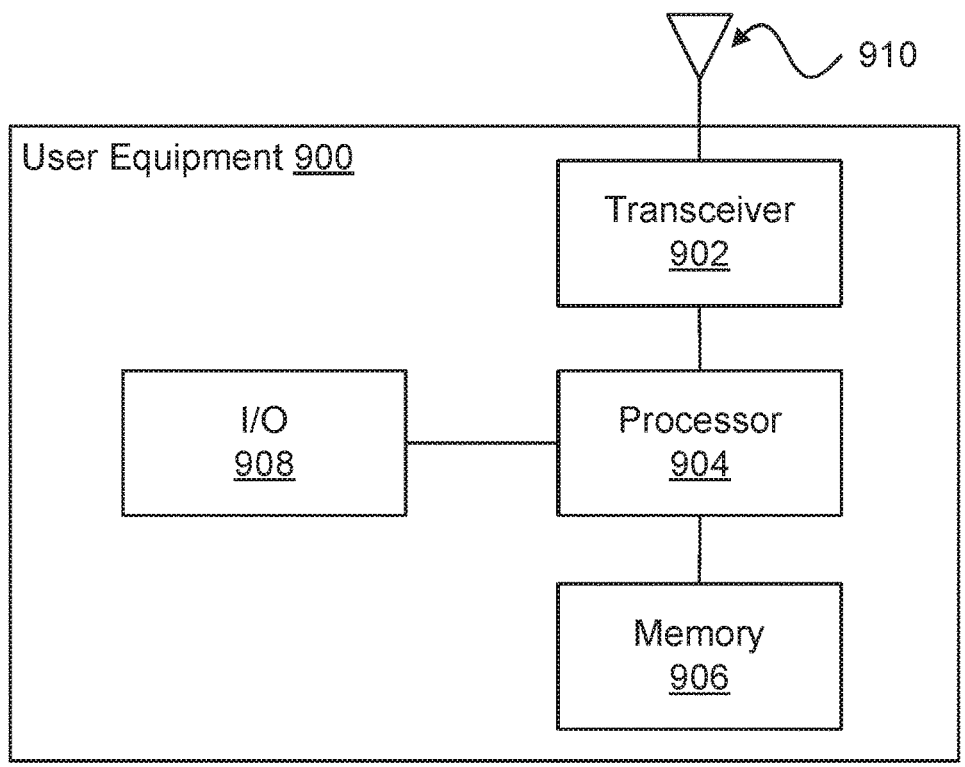
FIG. 15 is a block diagram of one embodiment of a client device.

FIG. 15 depicts an example of a user equipment (UE) 900. UE 900 may be used to implement UEs 110 in FIG. 1. UE 900 includes at least one processing unit or processor 904. The processor 904 implements various processing operations of the UE 900. For example, the processing unit 904 could perform signal coding, data processing, power control, input/output processing, or any other functionality enabling the UE 904 to operate in the communication system 100. The processor 904 also supports the methods and teachings described in more detail herein. Each processor 904 includes any suitable processing or computing device configured to perform one or more operations. Each processor 904 could, for example, include a microprocessor, microcontroller, digital signal processor, field programmable gate array, or application specific integrated circuit.

The UE 900 also includes at least one transceiver 902. The transceiver 902 is configured to modulate data or other content for transmission by at least one antenna 910. The transceiver 902 is also configured to demodulate data or other content received by the at least one antenna 910. Each transceiver 902 includes any suitable structure for generating signals for wireless transmission and/or processing signals received wirelessly. Each antenna 910 includes any suitable structure for transmitting and/or receiving wireless signals. One or multiple transceivers 902 could be used in the UE 900, and one or multiple antennas 910 could be used in the UE 900. Although shown as a single functional unit, a transceiver 902 could also be implemented using at least one transmitter and at least one separate receiver.

The UE 900 may be configured to transmit and receive signals below 6 GHz (e.g., a microwave frequency range), as well as over mmW frequency range (e.g., 6 GHz to 100 GHz). When transmitting/receiving in and/or over microwave or the mmW frequency range, the UE 900 may be configured to perform beam forming. For example, antenna 910 may include a phased-array beam antenna.

The UE 900 further includes one or more input/output devices 908. The input/output devices 908 facilitate interaction with a user. Each input/output device 908 includes any suitable structure for providing information to or receiving information from a user, such as a speaker, microphone, keypad, keyboard, display, or touch screen.

In addition, the UE 110 includes at least one memory 906. The memory is non-transitory memory storage, in one embodiment. The memory 906 stores instructions and data used, generated, or collected by the UE 900. For example, the memory 906 could store software or firmware instructions executed by the processor(s) 904 and data used to reduce or eliminate interference in incoming signals. Each memory 906 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 16:
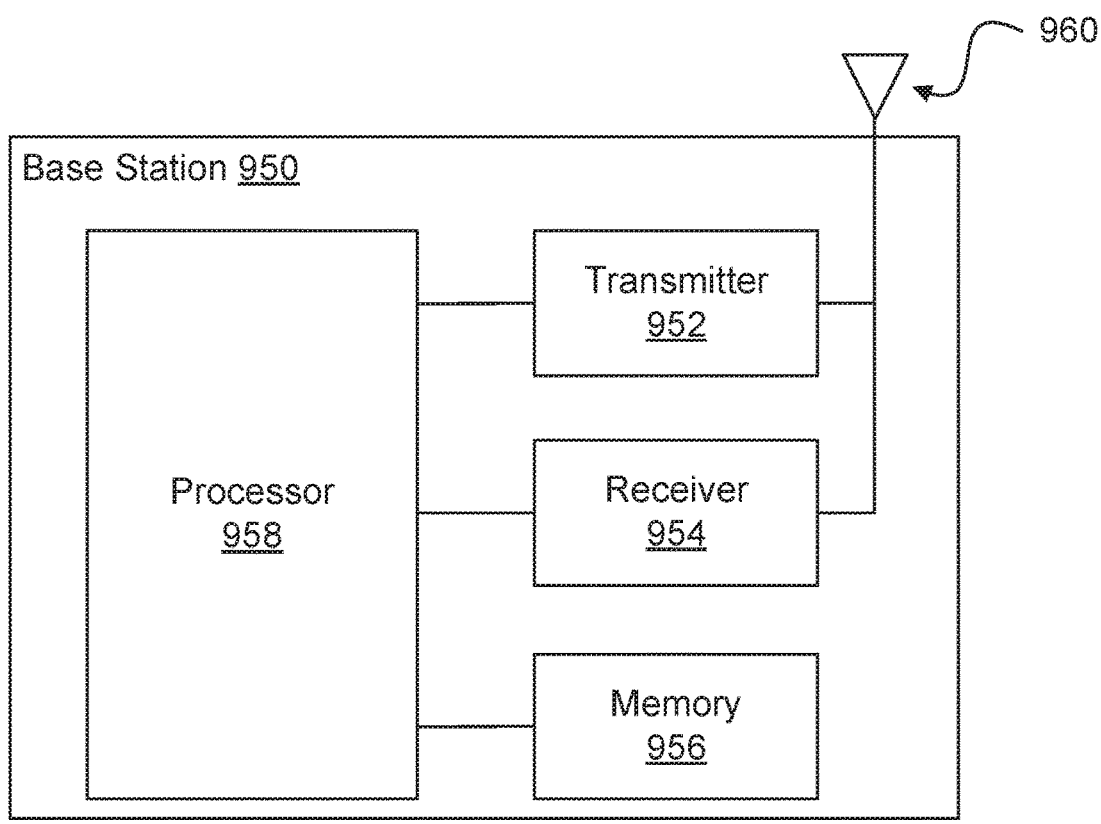
FIG. 16 is a block diagram of one embodiment of a base station.

FIG. 16 illustrates an example of a wireless communication access device 950. The wireless communication access device 950 may be used to implement a base station 170 or wireless access point. These components could be used in the system 100, or in any other suitable system. As shown in FIG. 16, the wireless communication access device 950 includes at least one process 958, at least one transmitter 952, at least one receiver 954, one or more antennas 960, and at least one memory 956. The processor 958 implements various processing operations of the wireless communication access device 950, such as signal coding, data processing, power control, input/output processing, or any other functionality. The processor 958 can also support the methods and teachings described in more detail above. Each processor 958 includes any suitable processing or computing device configured to perform one or more operations. Each processor 958 could, for example, include a microprocessor, microcontroller, digital signal processor, field programmable gate array, or application specific integrated circuit.

Each transmitter 952 includes any suitable structure for generating signals for wireless transmission to one or more UEs or other devices. Each receiver 954 includes any suitable structure for processing signals received wirelessly from one or more UEs or other devices. Although shown as separate components, at least one transmitter 952 and at least one receiver 954 could be combined into a transceiver. Each antenna 960 includes any suitable structure for transmitting and/or receiving wireless signals. While a common antenna 960 is shown here as being coupled to both the transmitter 952 and the receiver 954, one or more antennas 960 could be coupled to the transmitter(s) 952, and one or more separate antennas 960 could be coupled to the receiver(s) 954. Each memory 956 includes any suitable volatile and/or non-volatile storage and retrieval device(s).

When used as a base station 170 in wireless network, the device 950 may be configured to transmit and receive signals below 6 GHz (e.g., a microwave frequency range), as well as over mmW frequency range (e.g., 6 GHz to 100 GHz). When transmitting/receiving in and/or over the microwave or mmW frequency range, the device 950 may be configured to perform beam forming. For example, antenna 960 may include a phased-array beam antenna.

When used as a wireless access point, the device 950 may be configured to transmit and receive signals in the mmW range (e.g., 6 GHz to 100 GHz). When transmitting/receiving in and/or over the microwave or mmW frequency range, the device 950 may be configured to perform beam forming. For example, the device 950 may have a phased-array beam antenna.

Figure 17:
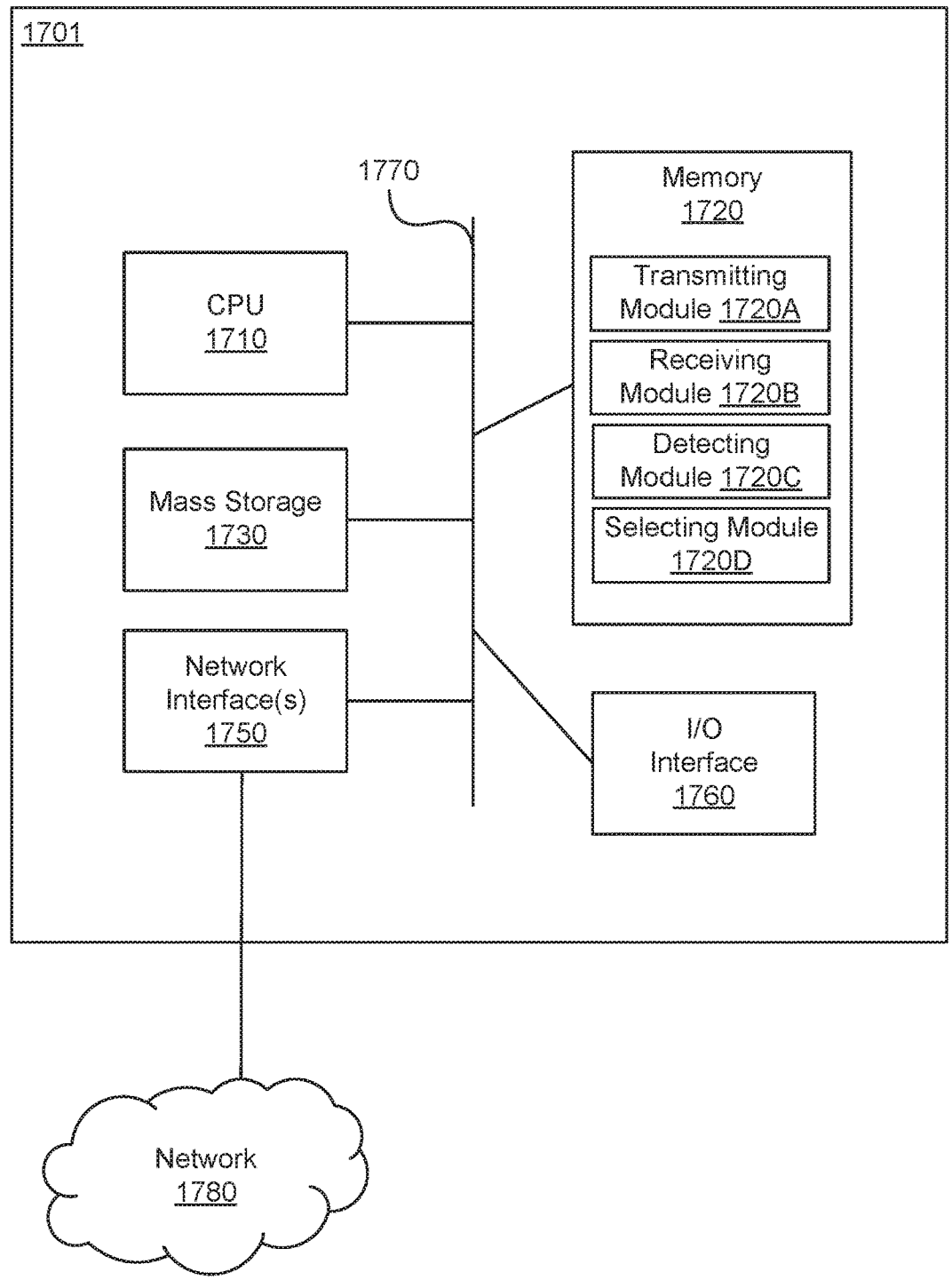
FIG. 17 is a block diagram of a computing system.

FIG. 17 is a high level block diagram of a computing system 1700 that can be used to implement various embodiments. In one example, computing system 1700 is a network system 1700. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 1701 equipped with one or more input/output devices, such as network interfaces, storage interfaces, and the like. The processing unit 1701 may include a central processing unit (CPU) 1310, a memory 1720, a mass storage device 1730, and an I/O interface 1760 connected to a bus. The bus may be one or more of any type of several bus architectures including a memory bus or memory controller, a peripheral bus or the like. Processing unit 1701 may be used to implement any of the computing devices described herein, such as base station 950 and/or user equipment 900.

The CPU 1710 may comprise any type of electronic data processor. The CPU 1710 may be configured to implement any of the schemes described herein, such as the processes illustrated in FIGS. 8-14 using any one or combination of steps described in the embodiments. The memory 1720 may comprise any type of system memory such as static random access memory (SRAM), dynamic random access memory (DRAM), synchronous DRAM (SDRAM), read-only memory (ROM), a combination thereof, or the like. In an embodiment, the memory 1720 may include ROM for use at boot-up, and DRAM for program and data storage for use while executing programs. In embodiments, the memory 1720 is non-transitory. In one embodiment, the memory 1720 includes a transmitting module 1720A transmitting a plurality of PRACH signals from a client device, a receiving module 1720B receiving from a base station a RAR, the RAR indicating a first PRACH signal of the plurality of PRACH signals and an uplink resource allocation, a detecting module 1720C detecting by the client device a synchronization signal block having a corresponding RACH occasion including a plurality of PRACH occasions, and a selecting module 1720D selecting a subset of PRACH occasions of the RACH occasion based on a receive beam on which the synchronization signal is received.

The mass storage device 1730 may comprise any type of storage device configured to store data, programs, and other information and to make the data, programs, and other information accessible via the bus. The mass storage device 1730 may comprise, for example, one or more of a solid state drive, hard disk drive, a magnetic disk drive, an optical disk drive, or the like.

The processing unit 1701 also includes one or more network interfaces 1750, which may comprise wired links, such as an Ethernet cable or the like, and/or wireless links to access nodes or one or more networks 1780. The network interface 1750 allows the processing unit 1701 to communicate with remote units via the network 1780. For example, the network interface 1750 may provide wireless communication via one or more transmitters/transmit antennas and one or more receivers/receive antennas. In an embodiment, the processing unit 1701 is coupled to a local-area network or a wide-area network for data processing and communications with remote devices, such as other processing units, the Internet, remote storage facilities, or the like. In one embodiment, the network interface 1750 may be used to receive and/or transmit interest packets and/or data packets in an ICN. Herein, the term "network interface" will be understood to include a port.

The processing unit 1701 may be configured to implement any of the schemes described herein, such as the processes illustrated in FIGS. 8-14 using any one or combination of steps described in the embodiments.

The components depicted in the computing system of FIG. 17 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 1720 or mass storage 1730) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers. In embodiments, the term "unit" may include a circuit (or integrated circuit) or software component.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method of wireless network communication, comprising:
   transmitting a plurality of physical random access channel (PRACH) signals from a client device, each PRACH signal is transmitted using a different transmit beam and the plurality of PRACH signals are transmitted in a random access channel (RACH) occasion corresponding to a plurality of synchronization signal blocks;
   receiving from a base station a random access response (RAR), received on a receive beam used for a first synchronization signal block of the plurality of synchronization signal blocks in which the first synchronization signal block is identified as a preferred synchronization signal block, in response to the plurality of PRACH signals, the RAR indicating a first PRACH signal of the plurality of PRACH signals and an uplink resource allocation; and
   transmitting a message from the client device using the uplink resource allocation and the transmit beam corresponding to the first PRACH signal.

2. The method of claim 1, wherein:
   each PRACH signal in the plurality of PRACH signals carries a random access preamble selected from a range of random access preambles, wherein the range of random access preambles corresponds to the first synchronization signal block received by the client device.

3. The method of claim 2, wherein:
   the random access preamble carried by each PRACH signal of the plurality is the same.

4. The method of claim 2, wherein:
   the random access preamble carried by each PRACH signal of the plurality is different.

5. The method of claim 2, further comprising:
   receiving the plurality of synchronization signal blocks including the first synchronization signal block; and
   receiving an indication of a range of random access preambles corresponding to at least one synchronization signal block of the plurality of synchronization signal blocks.

6. The method of claim 2, wherein:
   each PRACH signal comprises a random access preamble; and
   the RAR includes an identifier of the random access preamble corresponding to the first PRACH signal.

7. The method of claim 5, wherein receiving the indication of the range of random access preambles corresponding to the at least one synchronization signal block comprises:
   receiving the indication in the at least one synchronization signal block.

8. The method of claim 5, wherein receiving the indication of the range of random access preambles corresponding to the at least one synchronization signal block comprises:
   receiving the indication in a system information message.

9. The method of claim 2, wherein the random access preamble is selected for transmission on each of the PRACH signals in the plurality of PRACH signals from the range of random access preambles corresponding to the first synchronization signal block received by the client device.

10. The method of claim 2, further comprising:
    determining the first synchronization signal block received with a highest signal quality;
    wherein receiving a random access response further comprises receiving the random access response from a receive beam direction which is the same as a receive beam direction corresponding to the first synchronization signal block.

11. The method of claim 1, wherein a random access preamble selected for transmission on a first PRACH signal in the plurality of PRACH signals is selected based on an index of the first PRACH signal.

12. The method of claim 1, wherein:
    the first PRACH signal is determined by the base station to have a highest signal quality of the PRACH signals.

13. The method of claim 1, further comprising:
    detecting by the client device the first synchronization signal block having a RACH occasion including a plurality of PRACH occasions; and
    selecting a subset of PRACH occasions of the RACH occasion based on the receive beam on which the first synchronization signal is received, the subset of PRACH occasions including less than a total number of the plurality of PRACH occasions;
    wherein transmitting the plurality of PRACH signals comprises transmitting the plurality of PRACH signals in the subset of PRACH occasions.

14. A device, comprising:
    a non-transitory memory storage comprising instructions; and
    one or more processors in communication with the memory, wherein the one or more processors execute the instructions to:
    transmit a plurality of physical random access channel (PRACH) signals from a client device, each PRACH signal is transmitted using a different transmit beam and the plurality of PRACH signals are transmitted in a random access channel (RACH) occasion corresponding to a plurality of synchronization signal blocks;
    receive from a base station a random access response (RAR), received on a receive beam used for a first synchronization signal block of the plurality of synchronization signal blocks in which the first synchronization signal block is identified as a preferred synchronization signal block, in response to the plurality of PRACH signals, the RAR indicating a first PRACH signal of the plurality of PRACH signals and an uplink resource allocation; and
    transmit a message from the client device using the uplink resource allocation and the transmit beam corresponding to the first PRACH signal.

15. The device of claim 14, wherein:
    each PRACH signal in the plurality of PRACH signals carries a random access preamble selected from a range of random access preambles, wherein the range of random access preambles corresponds to the first synchronization signal block received by the client device.

16. The device of claim 15, wherein the one or more processors execute the instructions to:
    receive the plurality of synchronization signal blocks including the first synchronization signal block; and
    receive an indication of a range of random access preambles corresponding to at least one synchronization signal block of the plurality of synchronization signal blocks.

17. The device of claim 16, wherein the one or more processors execute the instructions to receive in the at least one synchronization signal block the indication of the range of random access preambles corresponding to the at least one synchronization signal block.

18. The device of claim 16, wherein the one or more processors execute the instructions to receive in a system message the indication of the range of random access preambles corresponding to the at least one synchronization signal block.

19. The device of claim 15, wherein the random access preamble is selected for transmission on each of the PRACH signals in the plurality of PRACH signals from the range of random access preambles corresponding to the first synchronization signal block received by the client device.

20. The device of claim 14, wherein a random access preamble selected for transmission on a first PRACH signal in the plurality of PRACH signals is selected based on an index of the first PRACH signal.

21. The device of claim 15, wherein the one or more processors execute the instructions to:
determine the first synchronization signal block received with a highest signal quality;
wherein receiving a random access response further comprises receiving the random access response from a receive beam direction which is the same as a receive beam direction corresponding to the first synchronization signal block.

22. A non-transitory computer-readable medium storing computer instructions for wireless network communication, that when executed by one or more processors, cause the one or more processors to perform the steps of:
transmit a plurality of physical random access channel (PRACH) signals from a client device, each PRACH signal is transmitted using a different transmit beam and the plurality of PRACH signals are transmitted in a random access channel (RACH) occasion corresponding to a plurality of synchronization signal blocks;
receive from a base station a random access response (RAR), received on a receive beam used for a first synchronization signal block of the plurality of synchronization signal blocks in which the first synchronization signal block is identified as a preferred synchronization signal block, in response to the plurality of PRACH signals, the RAR indicating a first PRACH signal of the plurality of PRACH signals and an uplink resource allocation; and
transmit a message from the client device using the uplink resource allocation and the transmit beam corresponding to the first PRACH signal.

23. The non-transitory computer-readable medium of claim 22, wherein:
each PRACH signal in the plurality of PRACH signals carries a random access preamble selected from a range of random access preambles, wherein the range of random access preambles corresponds to the first synchronization signal block received by the client device.

24. The non-transitory computer-readable medium of claim 23, wherein the one or more processors execute the instructions to:
receive the plurality of synchronization signal blocks including the first synchronization signal block; and
receive an indication of a range of random access preambles corresponding to at least one synchronization signal block of the plurality of synchronization signal blocks.

25. The non-transitory computer-readable medium of claim 23, wherein the one or more processors execute the instructions to:
determine the first synchronization signal block received with a highest signal quality;
wherein receiving a random access response further comprises receiving the random access response from a receive beam direction which is the same as a receive beam direction corresponding to the first synchronization signal block.

26. A device, comprising:
an antenna configured to receive one or more synchronization signal blocks; and
one or more processors in communication with the antenna, the one or more processors configured to transmit a plurality of physical random access channel (PRACH) signals from a client device, each PRACH signal is transmitted using a different transmit beam, and the plurality of PRACH signals are transmitted in a random access channel (RACH) occasion corresponding to a plurality of synchronization signal blocks, the one or more processors configured to receive from a base station a random access response (RAR), received on a receive beam used for a first synchronization signal block of the plurality of synchronization signal blocks in which the first synchronization signal block is identified as a preferred synchronization signal block, in response to the plurality of PRACH signals, the RAR indicating a first PRACH signal of the plurality of PRACH signals and an uplink resource allocation, the one or more processors configured to transmit a message from the client device using the uplink resource allocation and the transmit beam corresponding to the first PRACH signal.

27. The device of claim 26, wherein:
each PRACH signal in the plurality of PRACH signals carries a random access preamble selected from a range of random access preambles, wherein the range of random access preambles corresponds to the first synchronization signal block received by the client device.

28. The device of claim 27, wherein the one or more processors configured to:
receive the plurality of synchronization signal blocks including the first synchronization signal block; and
receive an indication of a range of random access preambles corresponding to at least one synchronization signal block of the plurality of synchronization signal blocks.

29. The device of claim 27, wherein the one or more processors configured to:
determine the first synchronization signal block received with a highest signal quality;
wherein receiving a random access response further comprises receiving the random access response from a receive beam direction which is the same as a receive beam direction corresponding to the first synchronization signal block.

30. A method at a base station for random access, comprising:
receiving, via a set of receive beams, a sequence of physical random access channel (PRACH) signals, wherein each PRACH signal in the sequence of PRACH signals includes a random access preamble and the sequence of PRACH signals are received in a random access channel (RACH) occasion corresponding to a plurality of synchronization signal blocks;

identifying a first PRACH signal, wherein the first PRACH signal is received via a first receive beam;
identifying a first synchronization signal block in the plurality of synchronization signal blocks is a preferred synchronization signal block based on the sequence in the RACH occasion corresponding to the first synchronization signal block;
transmitting a random access response (RAR) to a client device in response to the sequence of PRACH signals, wherein the RAR indicates the first PRACH signal, and wherein the RAR allocates a transmission resource; and
receiving, via the first receive beam, a message transmitted by the client using the allocated transmission resource.

31. The method of claim 30, wherein:
identifying the first PRACH signal comprises determining that the first PRACH signal has a highest signal quality of the sequence of PRACH signals.

32. The method of claim 30, wherein each PRACH signal includes a same random access preamble.

33. The method of claim 30, wherein each PRACH signal includes a different random access preamble.

34. The method of claim 30, further comprising:
transmitting the first synchronization signal block using a first transmit beam;
wherein transmitting the RAR comprises transmitting the RAR using the first transmit beam.

35. The method of claim 30, further comprising:
transmitting the plurality of synchronization signal blocks, each synchronization signal block is transmitted using a different transmit beam;
determining a first RACH preamble carried by the first PRACH signal;
determining by the base station that the first synchronization signal block is the preferred synchronization signal block received by the client device based on the RACH occasion and the first RACH preamble; and
identifying a first transmit beam used for the first synchronization signal block;
wherein transmitting the random access response comprises transmitting the random access response using the first transmit beam.

36. A device, comprising:
a non-transitory memory storage comprising instructions; and
one or more processors in communication with the memory, wherein the one or more processors execute the instructions to:
receive, via a set of receive beams, a sequence of PRACH signals, wherein each PRACH signal in includes a random access preamble and the sequence of PRACH signals are received in a random access channel (RACH) occasion corresponding to a plurality of synchronization signal blocks;
identify a first PRACH signal, wherein the first PRACH signal is received via a first receive beam;
identifying a first synchronization signal block in the plurality of synchronization signal blocks is a preferred synchronization signal block based on the sequence in the RACH occasion corresponding to the first synchronization signal block;
transmit a random access response (RAR) to a client device in response to the sequence of PRACH signals, wherein the RAR indicates the first PRACH signal, and wherein the RAR allocates a transmission resource; and
receive, via the first receive beam, a message transmitted by the client using the allocated transmission resource.

37. The device of claim 36, wherein each PRACH signal includes a same random access preamble.

38. The device of claim 36, wherein each PRACH signal includes a different random access preamble.

39. The device of claim 36, wherein the one or more processors execute the instructions to:
transmit first synchronization signal block using a first transmit beam;
wherein transmitting the RAR comprises transmitting the RAR using the first transmit beam.

40. The device of claim 36, wherein the one or more processors execute the instructions to:
transmit the plurality of synchronization signal blocks, each synchronization signal block is transmitted using a different transmit beam;
determine a first RACH preamble carried by the first PRACH signal;
determine by a base station that the first synchronization signal block is the preferred synchronization signal block received by the client device based on the RACH occasion and the first RACH preamble; and
identify a first transmit beam used for the first synchronization signal block;
wherein transmitting the RAR comprises transmitting the RAR using the first transmit beam.

41. A non-transitory computer-readable medium storing computer instructions for wireless network communication, that when executed by one or more processors, cause the one or more processors to perform the steps of:
receive, via a set of receive beams, a sequence of PRACH signals, wherein each PRACH signal includes a random access preamble and the sequence of PRACH signals are received in a random access channel (RACH) occasion corresponding to a plurality of synchronization signal blocks;
identify a first PRACH signal, wherein the first PRACH signal is received via a first receive beam;
identifying a first synchronization signal block in the plurality of synchronization signal blocks is a preferred synchronization signal block based on the sequence in the RACH occasion corresponding to the first synchronization signal block;
transmit a random access response (RAR) to a client devicein response to the sequence of PRACH signals, wherein the RAR indicates the first PRACH signal, and wherein the RAR allocates a transmission resource; and
receive, via the first receive beam, a message transmitted by the client using the allocated transmission resource.

42. The non-transitory computer-readable medium of claim 41, wherein the one or more processors execute the instructions to:
transmit the first synchronization signal block using a first transmit beam;
wherein transmitting the RAR comprises transmitting the RAR using the first transmit beam.

43. The non-transitory computer-readable medium of claim 41, wherein the one or more processors execute the instructions to:
transmit the plurality of synchronization signal blocks, each synchronization signal block is transmitted using a different transmit beam;
determine a first RACH preamble carried by the first PRACH signal;
determine by a base station that the first synchronization signal block is the preferred synchronization signal block received by the client device based on the RACH occasion and the first RACH preamble; and identify a first transmit beam used for the first synchronization signal block;

wherein transmitting the random access response comprises transmitting the random access response using the first transmit beam.

44. A method at a base station for random access, comprising:

receiving, via a set of receive beams, a sequence of PRACH signals wherein each PRACH signal in the sequence of PRACH signals comprises a same random access preamble and the sequence of PRACH signals are received in a random access channel (RACH) occasion corresponding to a plurality of synchronization signal blocks;

identifying a first PRACH signal, wherein the first PRACH signal is received via a first receive beam;

identifying a first synchronization signal block in the plurality of synchronization signal blocks is a preferred synchronization signal block based on the sequence in the RACH occasion corresponding to the first synchronization signal block;

transmitting a random access response (RAR) to a client device in response to the sequence of PRACH signals, wherein the RAR indicates the first PRACH signal, and wherein the RAR allocates a transmission resource; and receiving, via the first receive beam, a message transmitted by the client using the allocated transmission resource.

* * * * *

UNITED STATES PATENT AND TRADEMARK OFFICE
CERTIFICATE OF CORRECTION

PATENT NO. : 10,980,064 B2
APPLICATION NO. : 16/008783
DATED : April 13, 2021
INVENTOR(S) : Narasimha et al.

It is certified that error appears in the above-identified patent and that said Letters Patent is hereby corrected as shown below:

On the Title Page

Other Publications, Column 2, Line 1: please replace "Intemational" with --International--

In the Claims

Column 31, Line 50 (Claim 36, Line 8): please replace "in includes" with --includes--

Column 32, Line 44 (Claim 41, Line 19): please replace "devicein" with --device in--

Signed and Sealed this
Twenty-fourth Day of May, 2022

Katherine Kelly Vidal
*Director of the United States Patent and Trademark Office*